(12) United States Patent
Fukasawa

(10) Patent No.: US 10,861,412 B2
(45) Date of Patent: Dec. 8, 2020

(54) COLOR CONVERSION TABLE ADJUSTMENT METHOD

(71) Applicant: SEIKO EPSON CORPORATION, Tokyo (JP)

(72) Inventor: Kenji Fukasawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 16/221,807

(22) Filed: Dec. 17, 2018

(65) Prior Publication Data

US 2019/0189081 A1 Jun. 20, 2019

(30) Foreign Application Priority Data

Dec. 19, 2017 (JP) .................................. 2017-242387

(51) Int. Cl.
| | |
|---|---|
| *G09G 5/02* | (2006.01) |
| *G06K 15/02* | (2006.01) |
| *H04N 1/60* | (2006.01) |
| *H04N 9/64* | (2006.01) |

(52) U.S. Cl.
CPC ........... *G09G 5/02* (2013.01); *G06K 15/1878* (2013.01); *H04N 1/603* (2013.01); *H04N 9/64* (2013.01)

(58) Field of Classification Search
None
See application file for complete search history.

(56) References Cited

U.S. PATENT DOCUMENTS

| | | | | |
|---|---|---|---|---|
| 2005/0146738 A1* | 7/2005 | Narazaki | ................ | H04N 1/603 358/1.9 |
| 2010/0053653 A1* | 3/2010 | Hatori | ................ | H04N 1/40006 358/1.9 |
| 2012/0057785 A1* | 3/2012 | Morovic | .............. | H04N 1/6011 382/167 |
| 2013/0141740 A1* | 6/2013 | Shimbaru | .............. | H04N 1/603 358/1.9 |

(Continued)

FOREIGN PATENT DOCUMENTS

| | | |
|---|---|---|
| JP | 2010-114532 A | 5/2010 |
| JP | 2018-207328 A | 12/2018 |

(Continued)

*Primary Examiner* — Patrick F Valdez
(74) *Attorney, Agent, or Firm* — Global IP Counselors, LLP

(57) ABSTRACT

A color conversion table adjustment method for adjusting a color conversion table representing a correspondence relationship between coordinate values of an input color space and an output color space for a plurality of grid points by a computer, by using the plurality of reference grid points being referenced when output coordinate values are interpolated, adjustment points receiving step capable of acceptance of a plurality of adjustment points in the interpolation range that dividing the input color space, acquiring set adjustment amounts representing amounts of adjustment for the accepted adjustment points, determining, by using the set adjustment amounts for each of the plurality of adjustment points, grid point adjustment amounts representing amounts of adjustment for the plurality of reference grid points in a case where the plurality of adjustment points are accepted within the interpolation range, and adjusting the color conversion table, based on the grid point adjustment amounts.

8 Claims, 14 Drawing Sheets

(56) References Cited

U.S. PATENT DOCUMENTS

2019/0132488 A1    5/2019    Yamashita et al.
2019/0139511 A1    5/2019    Yamashita

FOREIGN PATENT DOCUMENTS

| JP | 2018-207329 A | 12/2018 | |
|----|---------------|---------|---|
| JP | 2019-009555 A | 1/2019 | |
| JP | 2019-009556 A | 1/2019 | |
| JP | 2019-068156 A | 4/2019 | |
| JP | 2019-087777 A | 6/2019 | |
| JP | 2019-087834 A | 6/2019 | |
| WO | WO-2019059946 A1 * | 3/2019 | ............... H04N 1/60 |

* cited by examiner

COLOR CONVERSION TABLE ADJUSTMENT METHOD

BACKGROUND

1. Technical Field

The invention relates to a technique for executing a process for adjusting a color conversion table used to convert coordinate values in a color space.

2. Related Art

International Color Consortium (ICC) profiles representing a correspondence relationship between device dependent colors and device independent colors are used to allow an ink jet-type printer to be used to calibrate printing such as offset printing. The device dependent colors provided by a printing machine (e.g., offset printing machine) and an ink jet-type printer are represented by coordinate values in a device dependent color space, for example, by CMYK values indicating the use amounts of cyan (C), magenta (M), yellow (Y), and black (K). The device independent colors are represented, for example, by hue values in a Commission Internationale de l'Eclairage (CIE, the International Commission on Illumination) L*a*b* color space (hereinafter "*" is omitted and the L*a*b* value is referred to as the Lab value) or by hue values in a CIE XYZ color space, the color spaces being device independent color spaces.

Here, it is assumed that the ICC profile for a printing machine is used as an input profile, and the ICC profile for an ink jet-type printer is used as an output profile. When CMYK values for the printing machine are converted into hue values (e.g., Lab values) in a Profile Connection Space (PCS) in accordance with the input profile, the hue values can be converted into CMYK values for the ink jet-type printer (hereinafter referred to as $CMYK_P$ values) in accordance with the output profile. When printing is performed using the ink jet-type printer in accordance with the $CMYK_P$ values, colors similar to the colors provided by the printing machine can be reproduced by the ink jet-type printer. In actuality, expected colors may fail to be reproduced due to an error in the profile, a color measurement error, a fluctuation in the printer, and the like. In such a case, spot color adjustment is performed by specifying an adjustment point representing a spot color to be adjusted, specifying an adjustment amount for the adjustment point, and modifying the ICC profile, based on the adjustment target.

JP-A-2010-114532 discloses a color conversion method for adjusting output values for grid points in a color conversion table in a device link profile that is a combination of an input profile and an output profile. In this color conversion method, for a plurality of grid points in the color conversion table included in an interpolation segment containing an adjustment color, output values for the grid points are adjusted such that adjustment amounts for the output values for the grid points are substantially equal to input adjustment amounts.

In the above-described color conversion method, an adjustment color is set only for one point in the interpolation segment. This precludes one point and another point in the interpolation segment from being adjusted as intended by a user, correspondingly preventing improvement of color reproduction accuracy.

Note that the above-described problem occurs not only in a case where the color conversion table in the device link profile is adjusted but also in a case where color conversion tables intended for various types of color equipment are adjusted, e.g., in a case where a color conversion table other than a color conversion table of an input profile or an output profile is adjusted and in a case where a color conversion table of an ICC profile is adjusted.

SUMMARY

An advantage of some aspects of the invention is to provide a technique for enabling improvement of color reproduction accuracy of a to-be-adjusted color conversion table.

To achieve the advantage, an aspect of the invention provides a color conversion table adjustment method for causing a computer to execute a process for adjusting a color conversion table representing a correspondence relationship between coordinate values in an input color space and coordinate values in an output color space for a plurality of grid points, the color conversion table adjustment method including:

enabling acceptance of a plurality of adjustment points within an interpolation range defined by a plurality of reference grid points included in the plurality of grid points in the color conversion table and referenced when output coordinate values in the output color space are interpolated, the interpolation range dividing the input color space, acquiring set adjustment amounts representing amounts of adjustment for the accepted adjustment points, determining, by using the set adjustment amounts for each of the plurality of adjustment points, grid point adjustment amounts representing amounts of adjustment for the plurality of reference grid points in a case where the plurality of adjustment points are accepted within the interpolation range, and adjusting the color conversion table, based on the grid point adjustment amounts.

An aspect of the invention provides a color conversion table adjustment method for causing a computer to execute a process for adjusting a color conversion table representing a correspondence relationship between coordinate values in an input color space and coordinate values in an output color space for a plurality of grid points, the color conversion table adjustment method including:

acquiring set adjustment amounts representing amounts of adjustment for a plurality of adjustment points present within an interpolation range defined by a plurality of reference grid points included in the plurality of grid points in the color conversion table and referenced when output coordinate values in the output color space are interpolated, the interpolation range dividing the input color space, determining, by using the set adjustment amounts, grid point adjustment amounts representing amounts of adjustment for the plurality of reference grid points, and adjusting the color conversion table, based on the grid point adjustment amounts, wherein a first adjustment point and a second adjustment point are two adjustment points located at different positions and included in the plurality of adjustment amounts accepted within the interpolation range, and a first reference grid point and a second reference grid point are two reference grid points located at different positions and included in the plurality of reference grid points, and in the determination of the grid point adjustment amounts, in a case where the set adjustment amounts for the first adjustment point are different from the set adjustment amounts for the second adjustment point, the grid point adjustment amounts for the first reference grid point are made different from the grid point adjustment amounts for the second reference grid point to determine the grid point adjustment amounts for the plurality of reference grid points.

An aspect of the invention provides a color conversion table adjustment method for causing a computer to execute a process for adjusting a color conversion table representing a correspondence relationship between coordinate values in an input color space and coordinate values in an output color space for a plurality of grid points, the color conversion table adjustment method including:

acquiring set adjustment amounts representing amounts of adjustment for a plurality of adjustment points present within an interpolation range defined by a plurality of reference grid points included in the plurality of grid points in the color conversion table and referenced when output coordinate values in the output color space are interpolated, the interpolation range dividing the input color space, determining grid point adjustment amounts representing amounts of adjustment for the plurality of reference grid points to be average values of the set adjustment amounts for the plurality of adjustment points accepted within the interpolation range, and adjusting the color conversion table, based on the grid point adjustment amounts.

Furthermore, another aspect of the invention provides a color conversion table adjustment program causing a computer to implement functions corresponding to the steps of the above-described color conversion table adjustment method.

Moreover, yet another aspect of the invention provides a color conversion table adjustment device including units corresponding to the steps of the above-described color conversion table adjustment method.

Moreover, still another aspect of the invention provides a color conversion table adjustment system including units corresponding to the steps of the above-described color conversion table adjustment method.

The above-described aspects can provide a technique further improving the color reproduction accuracy of a to-be-adjusted color conversion table.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
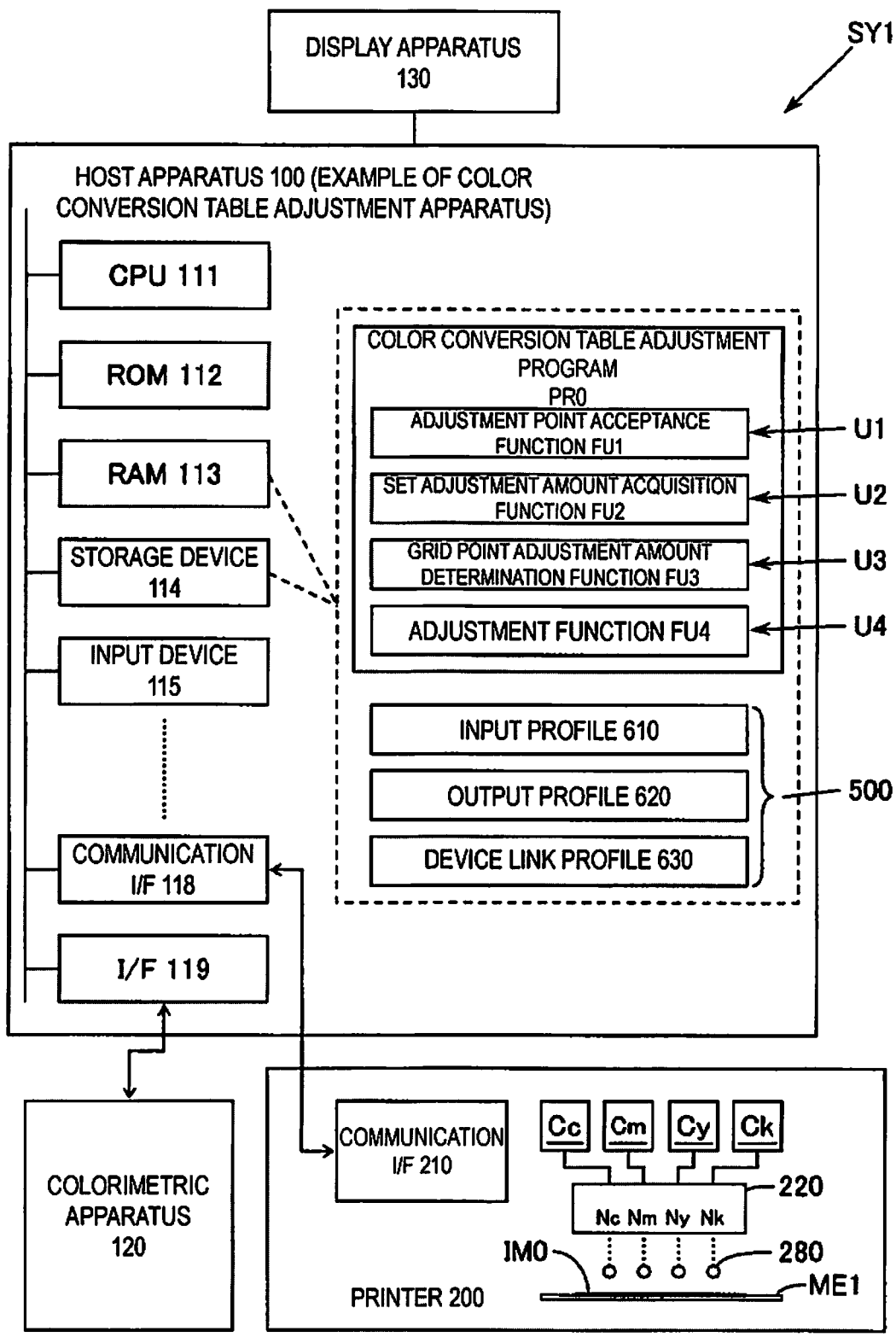
FIG. 1 is a block diagram schematically illustrating a configuration example of a color conversion table adjustment system.

Exemplary embodiments of the invention will be described. Of course, the following exemplary embodiments only illustrate the invention, and not all features illustrated in the exemplary embodiments are indispensable for the solution of the invention.

1. OVERVIEW OF TECHNIQUE INCLUDED IN INVENTION

First, an overview of the technique included in the invention will be described with reference to examples illustrated in FIGS. 1 to 14. Note that the drawings of the present application schematically illustrate the examples, that an enlargement factor in each direction illustrated in each drawing may vary among the drawings, and that the drawings may not be consistent with one another. Of course, the elements of the technique are not limited to specific examples illustrated with reference numerals.

Furthermore, in the present application, a numerical range "Min to Max" means a minimum value Min or greater and a maximum value Max or less.

Aspect 1

Figure 7:
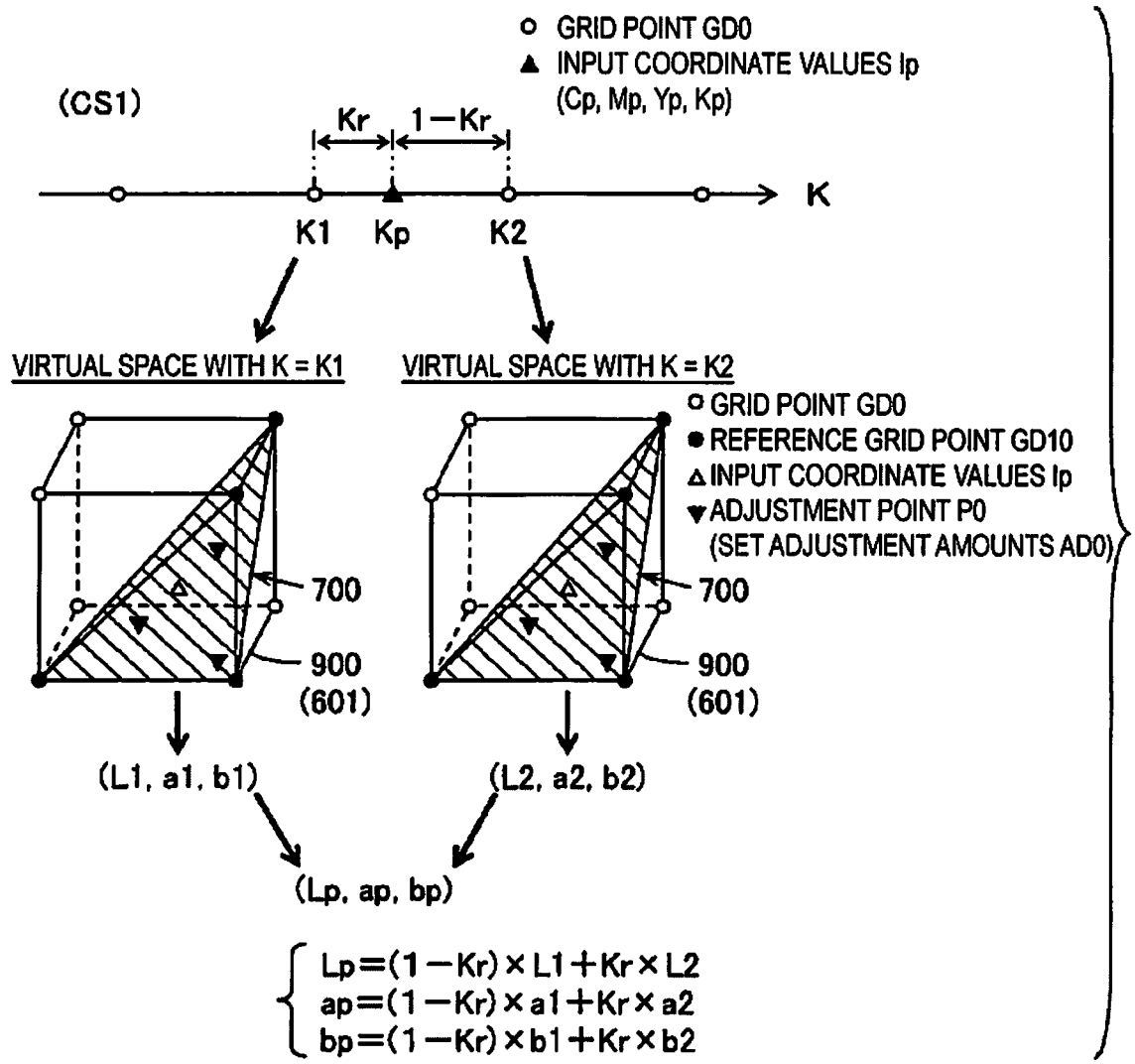
FIG. 7 is a diagram for schematically illustrating an example of N-point interpolation for a four-dimensional color conversion table.
Figure 8:
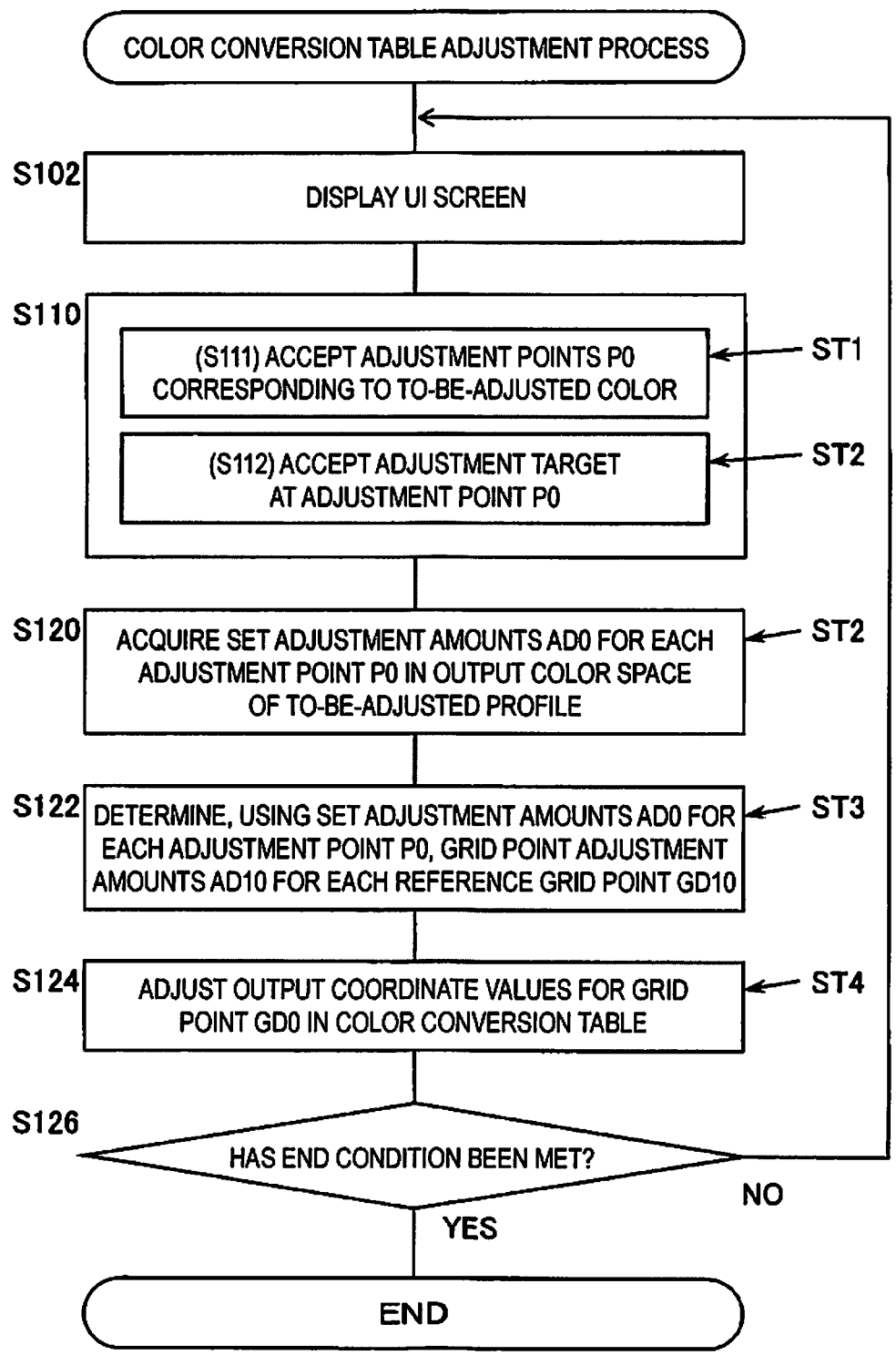
FIG. 8 is a flowchart illustrating an example of a color conversion table adjustment process.
Figure 9:
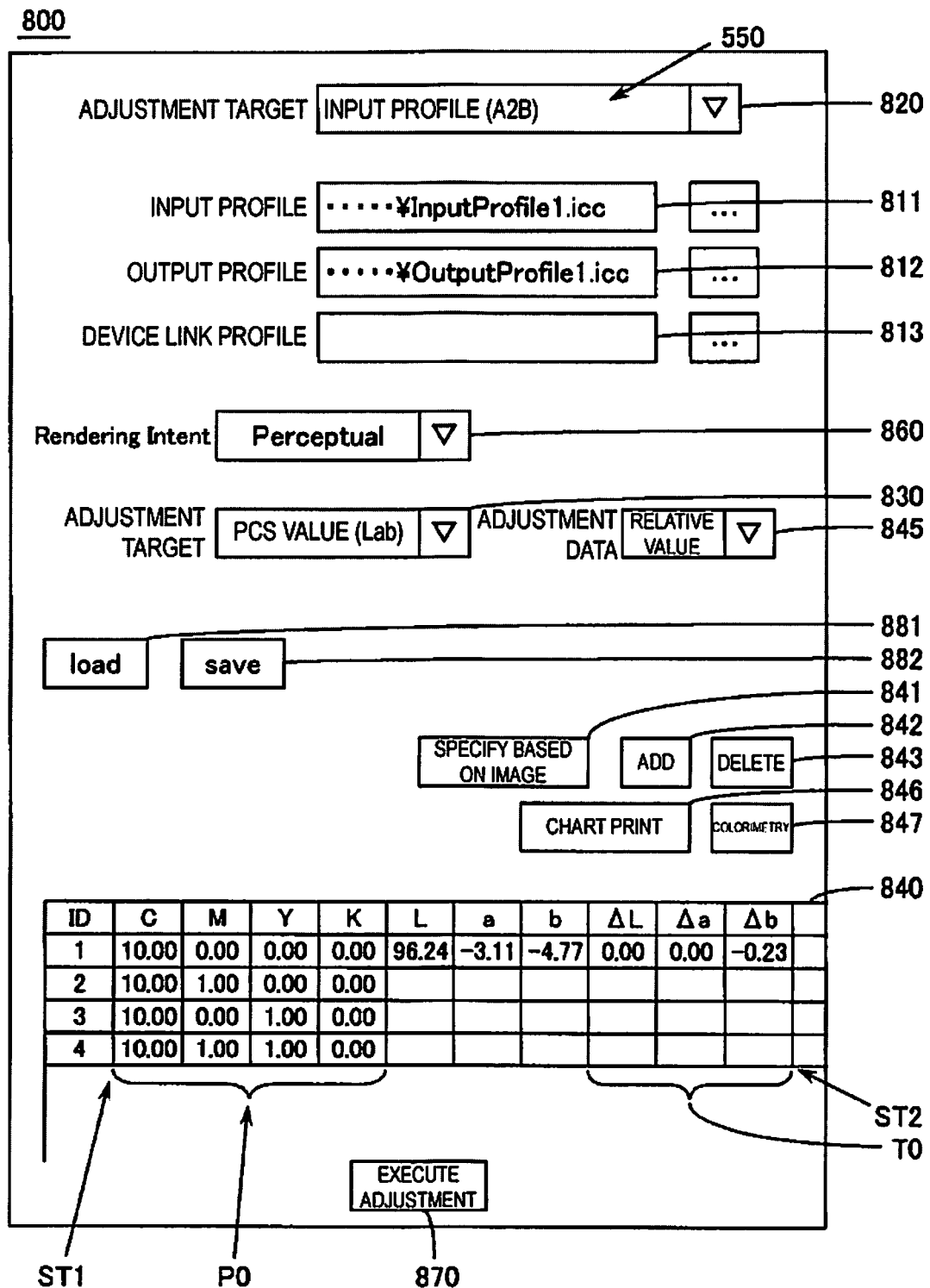
FIG. 9 is a diagram schematically illustrating an example of a user interface screen.

As illustrated in FIG. 1, FIG. 8, and the like, a color conversion table adjustment method according to Aspect 1 of the technique is a color conversion table adjustment method causing a computer (e.g., a host apparatus 100) to execute a process for adjusting a color conversion table 601 representing a correspondence relationship between coordinate values in an input color space CS4 and coordinate values in an output color space CS5 for a plurality of grid points GD0, the color conversion table adjustment method including an adjustment point acceptance step ST1, a set adjustment amount acquisition step ST2, a grid point adjustment amount determination step ST3, and an adjustment step ST4. As illustrated in FIGS. 6A to 6D and FIG. 7, in the adjustment point acceptance step ST1, it is possible to accept a plurality of adjustment points P0 within an interpolation range 700 defined by a plurality of reference grid points GD10 included in the plurality of grid points GD0 in the color conversion table 601 and referenced when output coordinate values in the output color space CS5 are interpolated, the interpolation range 700 dividing the input color space CS4. As illustrated in FIG. 9, the set adjustment amount acquisition step ST2 includes acquiring set adjustment amounts AD0 representing amounts of adjustment for the accepted adjustment points P0. The grid point adjustment amount determination step ST3 includes determining, by using the set adjustment amounts AD0 for each of the adjustment points P0, grid point adjustment amounts AD10 representing amounts of adjustment for the plurality of reference grid points GD10 in a case where the plurality of adjustment points P0 are accepted within the interpolation range 700. The adjustment step ST4 includes adjusting the color conversion table 601, based on the grid point adjustment amounts AD10.

In Aspect 1, a plurality of adjustment points P0 may be set within the same interpolation range 700. In this case, the set adjustment amounts AD0 for each of the adjustment points P0 are used to determine the grid point adjustment amounts AD10 for the plurality of reference grid points GD10, thus adjusting the color conversion table 601. Consequently, adjustment amounts for one point and adjustment amounts for another point within the same interpolation range 700 in the color conversion table 601 can be made closer to a user's intention. This enables accurate adjustment even in a case where a plurality of adjustment points are close to one another. Aspect 1 can therefore provide a color conversion table adjustment method improving the color reproduction accuracy of the to-be-adjusted color conversion table.

Examples of the input color space include a CMYK color space, a CMY color space, an RGB color space, a CIE Lab color space, and CIE XYZ color space. Note that R means red, G means green, and B means blue.

Examples of the output color space also include a CMYK color space, a CMY color space, an RGB color space, a CIE Lab color space, and CIE XYZ color space.

Examples of the color conversion table include an A2B table and a B2A table included in an ICC profile, a device link table, and a color conversion table integrated into a printer driver.

The interpolation range is determined by the reference grid points referenced when the output coordinate values are interpolated. For example, the interpolation range is, for tetrahedral interpolation, a tetrahedron including four reference grid points as vertexes and, for hexahedral interpolation, a hexahedron including eight reference grid point as vertexes.

The additional description of Aspect 1 also applies to the following aspects.

Aspect 2

Figure 13:
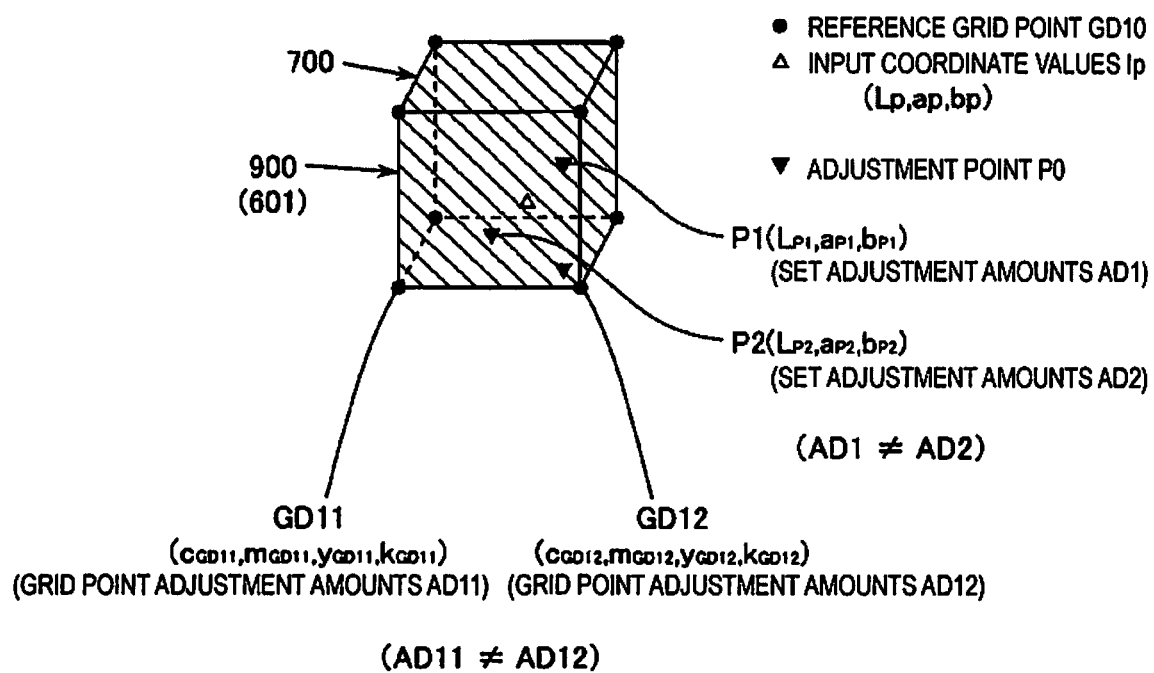
FIG. 13 is a diagram schematically illustrating an example where, in a case where set adjustment amounts for a first adjustment point are different from set adjustment amounts for a second adjustment point, grid point adjustment amounts for a first reference grid point are made different from grid point adjustment amounts for a second reference grid point.

As illustrated in FIG. 13, a first adjustment point P1 and a second adjustment point P2 are two adjustment points P0 located at different positions and included in the plurality of adjustment points P0 accepted within the interpolation range 700, and a first reference grid point GD11 and a second reference grid point GD12 are two reference grid points GD10 located at different positions and included in the plurality of reference grid points GD10. In the grid point adjustment amount determining step ST3, in a case where the set adjustment amounts AD1 for the first adjustment point P1 are different from the set adjustment amounts AD2 for the second adjustment point P2, the grid point adjustment amounts AD11 for the first reference grid point GD11 may be made different from the grid point adjustment amounts AD12 for the second reference grid point GD12 to determine the grid point adjustment amounts AD10 for the plurality of reference grid points GD10. In Aspect 2, in a case where the set adjustment amounts AD1 for the first adjustment point P1 are different from the set adjustment amounts AD2 for the second adjustment point P2 within the same interpolation range 700, the grid point adjustment amounts AD11 for the first reference grid point GD11 are different from the grid point adjustment amounts AD12 for the second reference grid point GD12. This allows provision of a suitable technique for improving the color reproduction accuracy of the to-be-adjusted color conversion table.

Aspect 3

As illustrated in FIGS. 10A to 10C and FIG. 11, the grid point adjustment amount determination step ST3 may include using values representing the positions of the plurality of adjustment points P0 within the interpolation range 700 and the set adjustment amounts AD0 to determine the grid point adjustment amounts AD10 for the plurality of reference grid points GD10. In Aspect 3, the positions of the plurality of adjustment points P0 within the interpolation range 700 are reflected in the grid point adjustment amounts AD10. This allows provision of a suitable technique improving the color reproduction accuracy of the to-be-adjusted color conversion table.

Aspect 4

Figure 11:
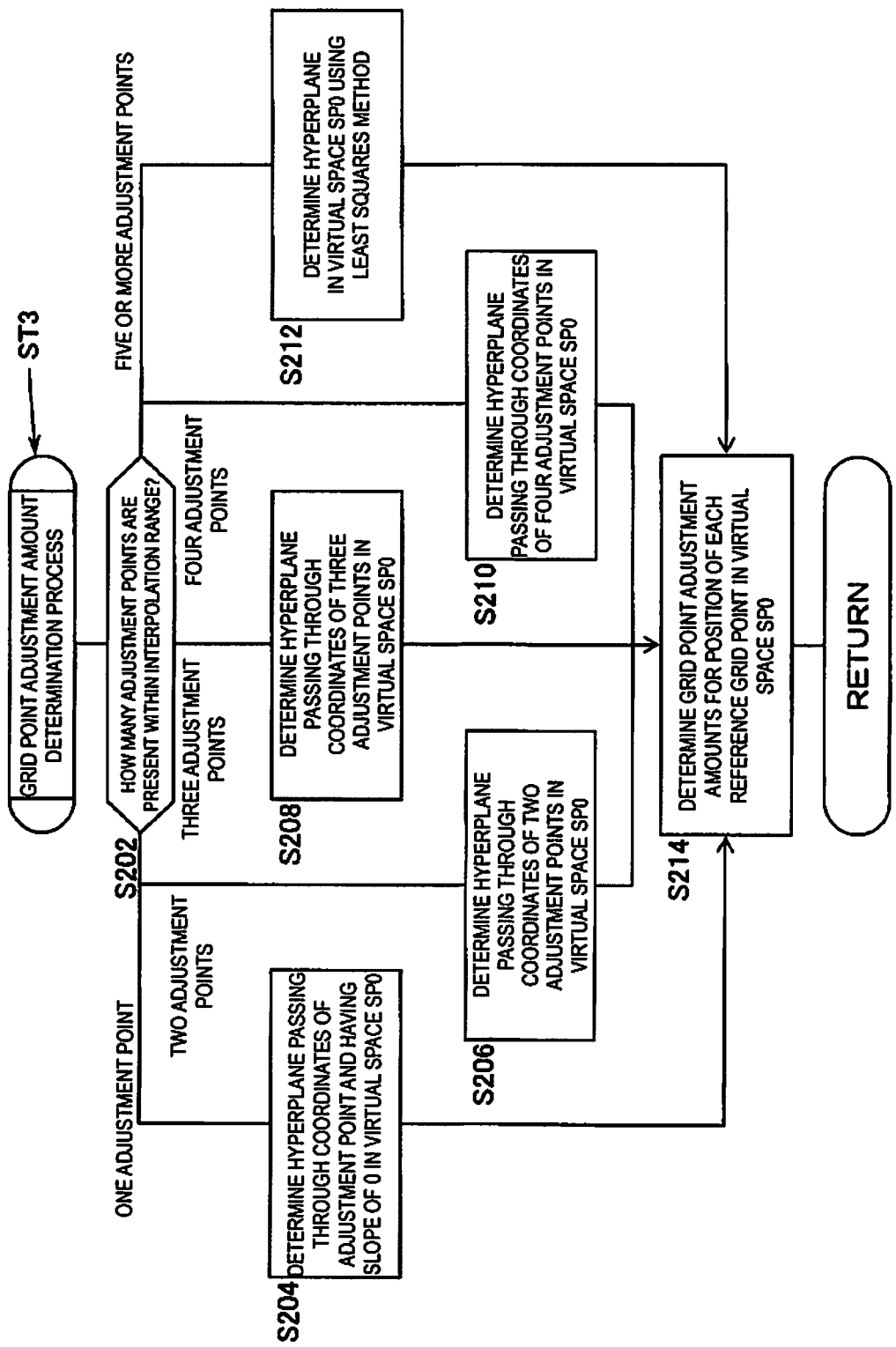
FIG. 11 is a flowchart illustrating an example of a grid point adjustment amount determination process.

Here, m+1-dimensional virtual space SP0 is assumed where m (m is an integer of 3 or larger and n or smaller) components included in components along n (n is an integer of 3 or larger) coordinate axes of the input color space CS4 and adjustment amounts AD representing amounts of adjustment for the color conversion table 601 and added as a component. As illustrated in FIG. 11, the grid point adjustment amount determination step ST3 may include determining, in the virtual space SP0, data representing a hyperplane adapted to positions with coordinates corresponding to the m components and the set adjustment amounts AD0 for the plurality of adjustment points P0 accepted within the interpolation range 700. The grid point adjustment amount determining step ST3 may include determining the grid point adjustment amounts AD10 to be the adjustment amounts AD satisfying the m components for the reference grid points GD10 in the hyperplane, based on data representing the hyperplane. In Aspect 4, the positions of the plurality of adjustment points P0 within the interpolation range 700 are more accurately reflected in the grid point adjustment amounts AD10. This allows provision of a more suitable technique improving the color reproduction accuracy of the to-be-adjusted color conversion table.

Here, the hyperplane is a concept of generalizing, to higher dimensions, the concept of a two-dimensional plane vs. a three-dimensional space, and means an n−1-dimensional partial space of an n-dimensional vector space (in this case, n is an integer of 2 or larger). One hyperplane has the property of dividing the whole space into two half spaces.

The additional description also applies to the following aspects.

Aspect 5

As illustrated in FIG. 11, the grid point adjustment amount determination step ST3 may include determining data representing the hyperplane passing through positions with coordinates corresponding to the m components and the set adjustment amounts AD0 for the plurality of adjustment points P0 in the virtual space SP0 in a case where 2 or more and m+1 or less adjustment points P0 are accepted within the interpolation range 700. Of course, the hyperplane passing through positions corresponding to the 2 or more and m+1 or less adjustment points is included in the hyperplane adapted to positions with coordinates corresponding to the m components and the set adjustment amounts for the plurality of adjustment points in Aspect 4. Aspect 5 allows provision of a more suitable technique improving the color reproduction accuracy of the to-be-adjusted color conversion table in a case where m+1 or less adjustment points are accepted within the interpolation range.

Aspect 6

As illustrated in FIG. 11, the grid point adjustment amount determination step ST3 may include using the least squares method to determine data representing the hyperplane in the virtual space SP0, in a case where m+2 or more adjustment points P0 are accepted within the interpolation range 700. Of course, the hyperplane determined by the least squares method is included in the hyperplane adapted to positions with coordinates corresponding to the m components and the set adjustment amounts for the plurality of adjustment points in Aspect 4. Aspect 6 allows provision of a more suitable technique improving the color reproduction accuracy of the to-be-adjusted color conversion table in a case where m+2 or more adjustment points P0 are accepted within the interpolation range.

The grid point adjustment amount determination step may include determining data representing the hyperplane by using, instead of the least squares method, any one of maximum likelihood estimation, Random Sampling Consensus (RANSAC), and M-estimation. Aspect 6 also allows provision of a more suitable technique improving the color reproduction accuracy of the to-be-adjusted color conversion table in a case where m+2 or more adjustment points are accepted within the interpolation range.

Aspect 7

Figure 14:
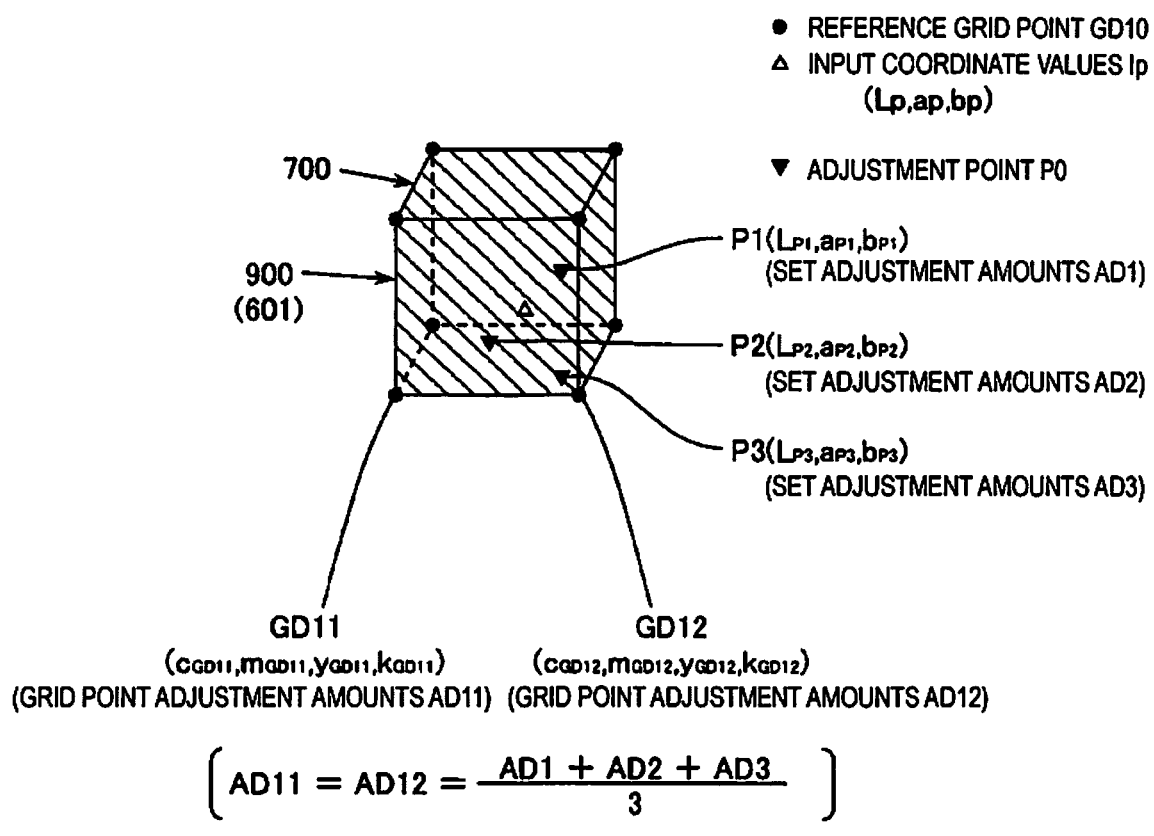
FIG. 14 is a diagram schematically illustrating an example where grid point adjustment amounts for a reference grid point are determined to be average values of set adjustment amounts for a plurality of adjustment points accepted within an interpolation range.

As illustrated in FIG. 14 and other than above-described Aspects 2 to 6, the grid point adjustment amount determination step ST3 may include determining the grid point adjustment amounts AD10 to be average values of the set adjustment amounts AD0 for the plurality of reference grid points GD10 accepted within the interpolation range 700. Aspect 7 can also provide a suitable technique improving the color reproduction accuracy of a to-be-adjusted color conversion table.

Aspect 8

A color conversion table adjustment method according to Aspect 8 of the technique is a color conversion table adjustment method causing a computer (e.g., the host apparatus 100) to execute a process for adjusting a color conversion table 601 representing the correspondence relationship between coordinate values in an input color space CS4 and coordinate values in an output color space CS5 for a plurality of grid points GD0, the color conversion table adjustment method including a set adjustment amount acquisition step ST2, a grid point adjustment amount determination step ST3, and an adjustment step ST4. The set adjustment amount acquisition step ST2 includes acquiring set adjustment amounts AD0 representing amounts of adjustment for a plurality of adjustment points P0 present within an interpolation range 700 defined by a plurality of reference grid points GD10 included in the plurality of grid points GD0 in the color conversion table 601 and referenced when output coordinate values in the output color space CS5 are interpolated, the interpolation range 700 dividing the input color space CS4.

The grid point adjustment amount determination step ST3 includes determining, by using the set adjustment amounts AD0, grid point adjustment amounts AD10 representing amounts of adjustment for the plurality of reference grid points GD10. The adjustment step ST4 includes adjusting the color conversion table 601, based on the grid point adjustment amounts AD10. Here, as illustrated in FIG. 13, a first adjustment point P1 and a second adjustment point P2 are two adjustment points P0 located at different positions and included in the plurality of adjustment points P0 accepted within the interpolation range 700, and a first reference grid point GD11 and a second reference grid point GD12 are two reference grid points GD10 located at different positions and included in the plurality of reference grid points GD10. In the grid point adjustment amount determining step ST3, in a case where the set adjustment amounts AD1 for the first adjustment point P1 are different from the set adjustment amounts AD2 for the second adjustment point P2, the grid point adjustment amounts AD11 for the first reference grid point GD11 are made different from the grid point adjustment amounts AD12 for the second reference grid point GD12 to determine the grid point adjustment amounts AD10 for the plurality of reference grid points GD10.

In Aspect 8, the set adjustment amounts AD0 for each of the plurality of adjustment points P0 are used to determine the grid point adjustment amounts AD10 for the plurality of reference grid points GD10, thus adjusting the color conversion table 601. In a case where the set adjustment amounts AD1 for the first adjustment point P1 are different from the set adjustment amounts AD2 for the second adjustment point P2 within the same interpolation range 700, the grid point adjustment amounts AD11 for the first reference grid point GD11 are different from the grid point adjustment amounts AD12 for the second reference grid point GD12. Thus, adjustment amounts for one point and adjustment amounts for another point within the same interpolation range 700 in the color conversion table 601 can be made closer to a user's intention. This enables accurate adjustment even in a case where a plurality of adjustment points are close to one another. Thus, Aspect 8 can provide a color conversion table adjustment method improving the color reproduction accuracy of the to-be-adjusted color conversion table.

Aspect 9

A color conversion table adjustment method according to Aspect 9 of the technique is a color conversion table adjustment method causing a computer (e.g., the host apparatus 100) to execute a process for adjusting a color conversion table 601 representing the correspondence relationship between coordinate values in an input color space CS4 and coordinate values in an output color space CS5 for a plurality of grid points GD0, the color conversion table adjustment method including a set adjustment amount acquisition step ST2, a grid point adjustment amount determination step ST3, and an adjustment step ST4. The set adjustment amount acquisition step ST2 includes acquiring set adjustment amounts AD0 representing amounts of adjustment for a plurality of adjustment points P0 present within an interpolation range 700 defined by a plurality of reference grid points GD10 included in the plurality of grid points GD0 in the color conversion table 601 and referenced when output coordinate values in the output color space CS5 are interpolated, the interpolation range 700 dividing the input color space CS4. As illustrated in FIG. 14, the grid point adjustment amount determination step ST3 includes determining grid point adjustment amounts AD10 representing amounts of adjustment for the plurality of reference grid points GD10 to be average values of the set adjustment amounts AD0 for the plurality of adjustment points P0 accepted within the interpolation range 700. The adjustment step ST4 includes adjusting the color conversion table 601, based on the grid point adjustment amounts AD10.

In Aspect 9, the grid point adjustment amounts AD10 are determined to be the average values of the set adjustment amounts AD0 for each of the plurality of adjustment points P0 present within the same interpolation range 700, thus adjusting the color conversion table 601. This suppresses significant deviation, from the user's intension, of the adjustment amounts for one point within the same interpolation range 700 in the color conversion table 601 and significant deviation, from the user's intension, of the adjustment amounts for another point within the same interpolation range 700. Thus, Aspect 9 can provide a color conversion table adjustment method improving the color reproduction accuracy of the to-be-adjusted color conversion table.

Aspect 10

A color conversion table adjustment program PRO according to Aspect 10 of the technique causes a computer (e.g., the host apparatus 100) to implement functions corresponding to the steps of Aspects 1 to 7, i.e., an adjustment point acceptance function FU1 corresponding to the adjustment point acceptance step ST1, a set adjustment amount acquisition function FU2 corresponding to the set adjustment amount acquisition step ST2, a grid point adjustment amount determination function FU3 corresponding to the grid point adjustment amount determination step ST3, and an adjustment function FU4 corresponding to the adjustment step ST4. Aspect 10 can provide a color conversion table adjustment program improving the color reproduction accuracy of the to-be-adjusted color conversion table.

Aspect 11

Furthermore, a color conversion table adjustment program PRO according to Aspect 11 of the invention causes a computer (e.g., the host apparatus 100) to implement functions FU2, FU3, and FU4 corresponding to the steps ST2, ST3, and ST4 of Aspect 8. Aspect 11 can also provide a color conversion table adjustment program improving the color reproduction accuracy of the to-be-adjusted color conversion table 601.

Aspect 12

Moreover, a color conversion table adjustment program PRO according to another aspect of the technique causes a computer (e.g., the host apparatus 100) to implement functions FU2, FU3, and FU4 corresponding to the steps ST2, ST3, and ST4 of Aspect 9. Aspect 12 can also provide a color conversion table adjustment program improving the color reproduction accuracy of the to-be-adjusted color conversion table.

Aspect 13

Furthermore, a color conversion table adjustment apparatus (e.g., the host apparatus 100) according to Aspect 13 of the technique includes an adjustment point acceptance unit U1 corresponding to the adjustment point acceptance step ST1, a set adjustment amount acquisition unit U2 corresponding to the set adjustment amount acquisition step ST2, a grid point adjustment amount determination unit U3 corresponding to the grid point adjustment amount determination step ST3, and an adjustment function U4 corresponding to the adjustment step ST4. Aspect 13 can provide a color conversion table adjustment apparatus improving the color reproduction accuracy of the to-be-adjusted color conversion table 601.

Aspect 14

Moreover, a color conversion table adjustment apparatus (e.g., the host apparatus 100) according to Aspect 14 of the technique includes units corresponding to the steps ST2, ST3 and ST4 of Aspect 8, i.e., a set adjustment amount acquisition unit U2, a grid point adjustment amount determination unit U3, and an adjustment function U4. Aspect 14 can also provide a color conversion table adjustment apparatus improving the color reproduction accuracy of the to-be-adjusted color conversion table 601.

Aspect 15

Moreover, a color conversion table adjustment apparatus (e.g., the host apparatus 100) according to Aspect 15 of the technique includes units corresponding to the steps ST2, ST3 and ST4 of Aspect 9, i.e., a set adjustment amount acquisition unit U2, a grid point adjustment amount determination unit U3, and an adjustment function U4. Aspect 15 can also provide a color conversion table adjustment apparatus improving the color reproduction accuracy of the to-be-adjusted color conversion table 601.

Aspect 16

Moreover, a color conversion table adjustment system SY1 according to Aspect 16 of the technique includes a printing apparatus (for example, a printer 200) for printing a color chart including patches, a colorimetric apparatus 120 executing a colorimetric process on the patches, and the units of any one of Aspects 13 to 15. Aspect 16 can provide a color conversion table adjustment system improving the color reproduction accuracy of the to-be-adjusted color conversion table.

Moreover, the technique is applicable to a control method for a color conversion table adjustment apparatus, a composite system including the color conversion table adjustment apparatus, a control method for the composite system, a control program for the color conversion table adjustment apparatus, a control program for the composite system, a computer readable medium recording a color conversion table adjustment program and the control programs, and the like. The above-described apparatus may include a plurality of separate units.

2. SPECIFIC EXAMPLE OF CONFIGURATION OF COLOR CONVERSION TABLE ADJUSTMENT SYSTEM

FIG. 1 schematically illustrates a configuration example of a color conversion table adjustment system including a color conversion table adjustment apparatus. A color conversion table adjustment system SY1 illustrated in FIG. 1 includes the host apparatus 100 (an example of the color conversion table adjustment apparatus), a display apparatus 130, the colorimetric apparatus 120, and an ink jet-type printer 200. In the host apparatus 100, a Central Processing Unit (CPU) 111, a Read Only Memory (ROM) 112, a Random Access Memory (RAM) 113, a storage device 114, an input device 115, a communication interface (I/F) 118, a colorimetric apparatus I/F 119, and the like are connected to one another, to be able to output and receive information to and from one another. The ROM 112, the RAM 113, and the storage device 114 are memories, and at least the ROM 112 and the RAM 113 are semiconductor memories. The display apparatus 130 displays a screen corresponding to display data from the host apparatus 100, based on the display data. A liquid crystal display panel or the like may be used for the display apparatus 130.

The storage device 114 stores an operating system (OS) not illustrated in the drawings, a color conversion table adjustment program PRO, a profile 500, and the like. The OS, the color conversion table adjustment program PRO, the profile 500, and the like are read into the RAM 113 when appropriate, to be used for a process for adjusting the profile 500. Here, the profile 500 is a generic term for an input profile 610, an output profile 620, and a device link profile 630. At least one of the RAM 113 and the storage device 114 stores various pieces of information, for example, the input profile 610, the output profile 620, the device link profile 630, and an adjustment history not illustrated in the drawings. The storage device 114 may be a nonvolatile semiconductor memory such as a flash memory, a magnetic storage device such as a hard disk, or the like.

The input device 115 may be a pointing device, a hard key including a keyboard, a touch panel attached to a surface of a display panel, or the like. The communication I/F 118 is connected to a communication I/F 210 in the printer 200 to output and receive information such as print data to and from the printer 200. The colorimetric apparatus I/F 119 is connected to the colorimetric apparatus 120 to acquire colorimetric data including colorimetric values, from the colorimetric apparatus 120. Standards to which the I/Fs 118, 119, and 210 conform to may include Universal Serial Bus (USB), near-field communication, and the like. Communication through the communication I/Fs 118, 119, and 210 may be wired or wireless or may be network communication such as through a Local Area Network (LAN) or the Internet.

The colorimetric apparatus 120 is capable of executing a colorimetric process on each color patch formed on a print substrate that is an example of a medium on which a color chart is formed, to output a colorimetric value. The patch is also referred to as a color chip. The colorimetric value is defined as a value representing, e.g., a lightness L and chromaticity coordinates a and b in a CIE Lab color space. The host apparatus 100 acquires colorimetric data from the colorimetric apparatus 120 to execute various processes.

The color conversion table adjustment program PRO illustrated in FIG. 1 causes the host apparatus 100 to implement the adjustment point acceptance function FU1, the set adjustment amount acquisition function FU2, the grid point adjustment amount determination function FU3, and the adjustment function FU4.

The CPU 111 of the host apparatus 100 reads, into the RAM 113, the information stored in the storage device 114 when appropriate and executes the read program to perform various processes. The CPU 111 executes the color conversion table adjustment program PRO read into the RAM 113 to perform processes corresponding to the above-described functions FU1 to FU4. The color conversion table adjustment program PRO causes the host apparatus 100, which is a computer, to function as the adjustment point acceptance function U1, the set adjustment amount acquisition function U2, the grid point adjustment amount determination function U3, and the adjustment function U4. Furthermore, the host apparatus 100 executing the color conversion table adjustment program PRO implements the adjustment point acceptance step ST1, the set adjustment amount acquisition step ST2, the grid point adjustment amount determination step ST3, and the adjustment step ST4. The computer readable medium, which stores the color conversion table adjustment program PRO causing the computer to implement the above-described functions FU1 to FU4, is not limited to the storage device inside the host apparatus but may be a recording medium outside the host apparatus.

Note that examples of the host apparatus 100 include computers such as personal computers (including tablet terminals). For example, in a case where a main body of a desktop personal computer is applied to the host apparatus 100, the display apparatus 130, the colorimetric apparatus 120, and the printer 200 are typically connected to the main body. In a case where a display apparatus-integrated computer such as a notebook personal computer is applied to the host apparatus 100, the colorimetric apparatus 120 and the printer 200 are typically connected to the computer. The display apparatus-integrated host apparatus similarly outputs display data to the internal display apparatus. Furthermore, the host apparatus 100 may include all the components 111 to 119 in one housing but may include a plurality of devices separated from one another in such a manner that allows the devices to communicate with one another. Moreover, the technique can be implemented even in a case where at least a part of the display apparatus 130, the colorimetric apparatus 120, and the printer 200 is included in the host apparatus 100.

The printer 200 (an example of an output device) illustrated in FIG. 1 is assumed to be an ink jet-type printer that discharges (injects) a cyan (C) ink, a magenta (M) ink, a yellow (Y) ink, and a black (K) ink from a recording head 220 as color materials to form an output image IMO corresponding to print data. The recording head 220 is fed with the cyan, magenta, yellow, and black (CMYK) inks from ink cartridges Cc, Cm, Cy, and Ck, respectively, to discharge CMYK ink droplets 280 through respective nozzles Nc, Nm, Ny, and Nk. When the ink droplets 280 land on a print substrate ME1, ink dots are formed on the print substrate ME1. As a result, printed matter is provided including an output image IMO on the print substrate ME1.

3. SPECIFIC EXAMPLE OF COLOR MANAGEMENT SYSTEM

Now, with reference to FIG. 2, an example of a color management system to which the technique is applicable will be described.

Figure 2:
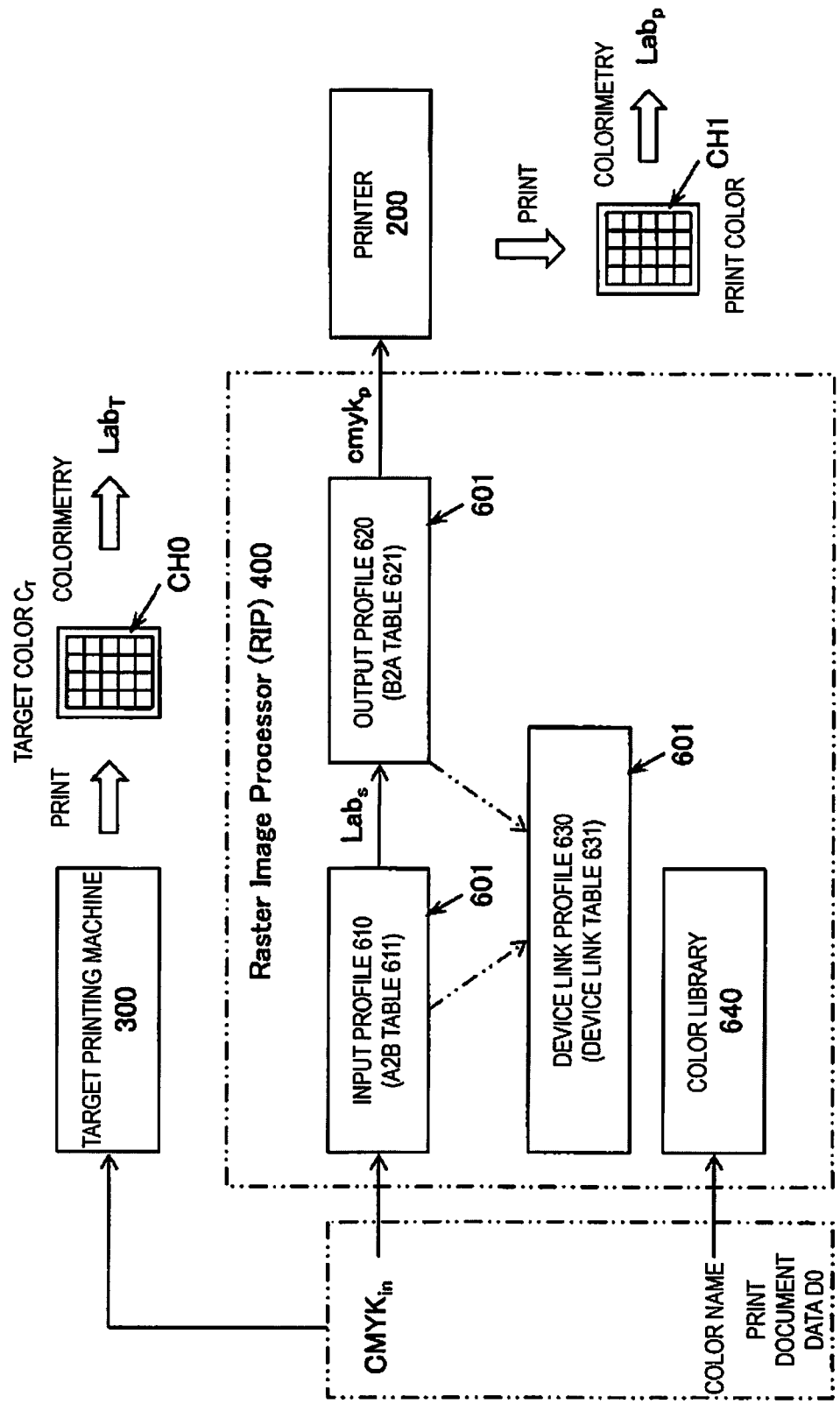
FIG. 2 is a diagram schematically illustrating an example of a color management flow.

The color management system illustrated in FIG. 2, for example, causes a Raster Image Processor (RIP) 400 implemented in the host apparatus 100 to convert print document data DO into output data representing print colors $cmyk_p$ (cyan, magenta, yellow, and black), and causes the ink jet-type printer 200 to form printed matter. The print document data DO represents process colors $CMYK_{in}$ allowing a target color ($C_T$) to be reproduced using CMYK inks (color materials) in a target printing machine 300, an example of a target apparatus for color matching. Color names in a color library 640 may be specified in the print document data DO. As the color library 640, Pantone (trade name) color library may be employed, for example.

The target printing machine 300 is assumed to be an offset printing machine but may be a photogravure press, a flexographic press, or the like. The target color $C_T$ is represented, for example, by a coordinate value (Lab value) in the CIE Lab color space. FIG. 2 illustrates how the target printing machine 300 prints, on the print substrate, a color chart CH0 representing the target color $C_T$ and how the colorimetric apparatus executes a colorimetric process on each patch of the color chart CH0 to acquire a colorimetric value $Lab_T$. The process colors $CMYK_{in}$ correspond to the use amounts of the CMYK inks used in the target printing machine 300, and represent coordinates in the CMYK color space depending on the target printing machine 300.

The RIP 400 illustrated in FIG. 2 includes the input profile 610, the output profile 620, the device link profile 630, and the color library 640. The input profile 610 is a file describing color properties of inks used in the target printing machine 300. The output profile 620 is a file describing color properties of inks used in the ink jet-type printer 200. The device link profile 630 is a combination profile of the input profile 610 and the output profile 620. For the profiles 610, 620, and 630, for example, a data format of an ICC profile may be used. The process colors $CMYK_{in}$ in the print document data DO are converted into print colors $cmyk_p$ through a first conversion path involving passage though colors Labs in the Lab color space or a second conversion path avoiding the passage through the colors Labs in the Lab color space. In the first conversion path, the process colors $CMYK_{in}$ are converted into colors $Lab_s$ in the Lab color space in accordance with an A2B table 611 of the input profile 610, and into print colors $cmyk_p$ in accordance with a B2A table 621 of the output profile 620. In the second conversion path, the process colors $CMYK_{in}$ are converted into print colors $cmyk_p$ in accordance with a device link table 631 of the device link profile 630. Here, the A2B table 611, the B2A table 621, and the device link table 631 are collectively referred to as the color conversion table 601.

In a case where the printer 200 uses a total of four inks, i.e., the CMYK inks, the print colors $cmyk_p$ are output to the printer 200, which reproduces the print colors $cmyk_p$ on the printed matter. FIG. 2 illustrates how the printer 200 prints a color chart CH1 representing the print colors $cmyk_p$ on the print substrate and how the colorimetric apparatus 120 executes a colorimetric process on each patch of the color chart CH1 to acquire colorimetric values $Lab_p$. In a case where the printer 200 also uses inks such as light cyan (Lc), light magenta (Lm), dark yellow (DY), and light black (Lk), when the RIP 400 or the printer 200 classifies the print colors $cmyk_p$ into deep colors and light colors, the printer 200 can reproduce the print colors $cmyk_p$ on the printed matter. Of course, the print colors are not limited to a total of four colors, CMYK.

Furthermore, in a case where color names are set in the print document data DO, the RIP 400 may reference the color library 640 to convert the color names into colors $Lab_s$ in the Lab color space.

Note that the RIP 400 also includes an input profile for a conversion between coordinate values in the Lab color space and process colors other than the process colors $CMYK_{in}$, e.g., process colors (denoted by $CMY_{in}$) representing the use amounts of color materials of only three primary colors CMY corresponding to subtractive color mixture or process colors (denoted by $RGB_{in}$) representing the intensities of three primary colors of red (R), green (G), and blue (B) corresponding to additive color mixture. Therefore, the RIP 400 can convert the process colors $CMY_{in}$, the process colors $RGB_{in}$, or the like into print colors $cmyk_p$ via the Lab color space. In addition, the RIP 400 can receive colors $Lab_s$ in the Lab color space to convert the colors into the corresponding print color $cmyk_p$.

As described above, the ink jet-type printer 200 can reproduce colors similar to colors reproduced by the target printing machine 300. However, in actuality, expected colors may fail to be reproduced due to an error in the profile, a color measurement error, a fluctuation in the printer, and the like. In such a case, modifications to the profiles 610, 620 and 630 increase a conversion accuracy of the target color.

4. SPECIFIC EXAMPLES OF PROFILES

Figure 3:
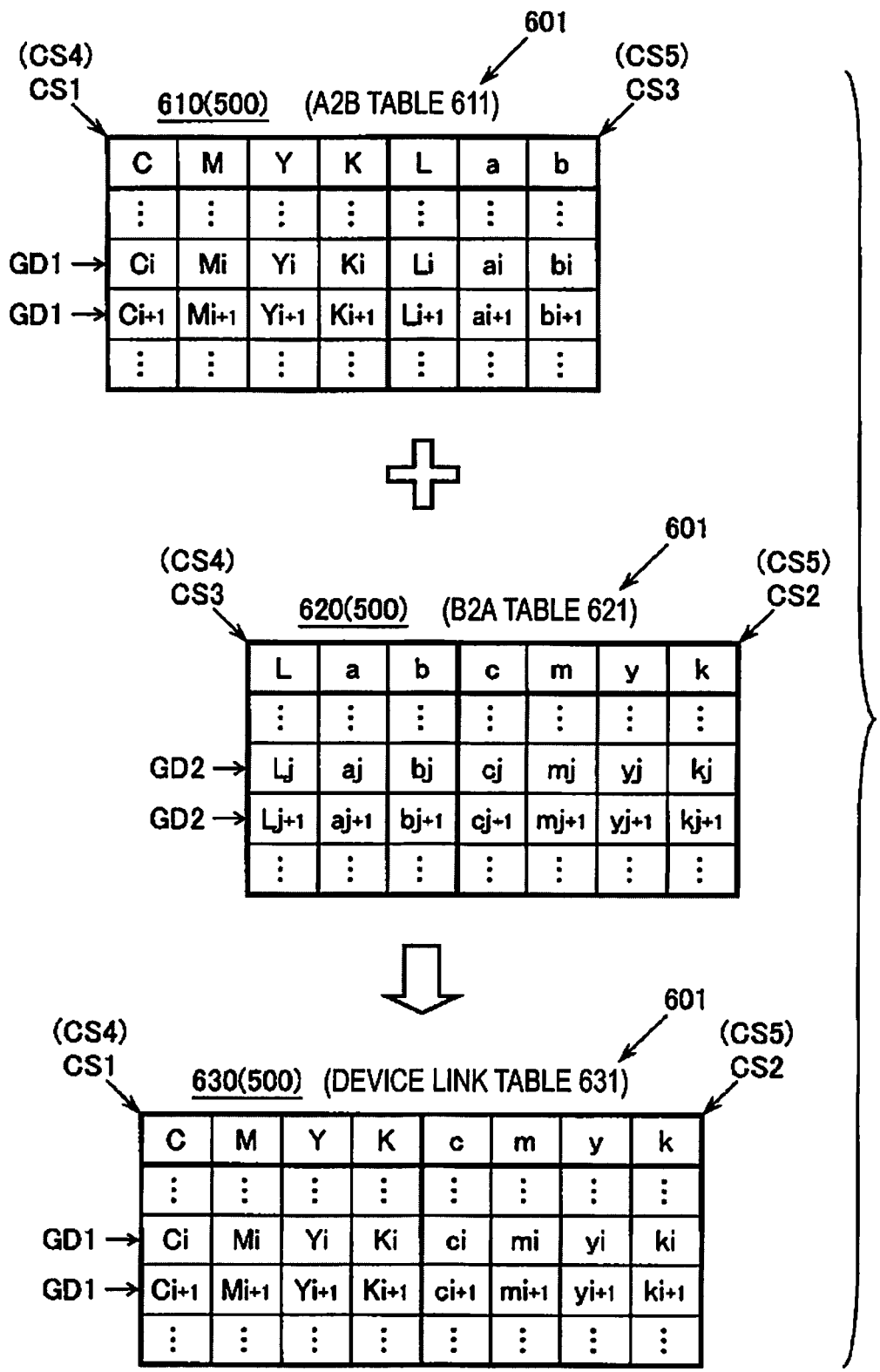
FIG. 3 is a diagram schematically illustrating an example of a relationship between various profiles.

FIG. 3 schematically illustrates a relationship among the input profile 610, the output profile 620, and the device link profile 630.

As illustrated in FIG. 3, the input profile 610 is data specifying a correspondence relationship between CMYK values ($C_i$, $M_i$, $Y_i$, $K_i$) in the CMYK color space (an example of the first device dependent color space CS1) corresponding to the inks used in the target printing machine 300 and Lab values ($L_i$, $a_i$, $b_i$) in the Lab color space (an example of the Profile Connection Space (PCS) CS3). In this case, grid points GD1 in the A2B table 611 are typically arranged in the CMYK color space at substantially equal intervals in a C axis direction, an M axis direction, a Y axis direction, and a K axis direction. Here, the variable i is a variable identifying each grid point GD1 set in the CMYK color space (CS1). The CMYK values are an example of first coordinate values. The Lab values are an example of device independent coordinate values. In a case where only the input profile 610 is used, the CMYK color space (CS1) is an example of an input color space CS4, and the Lab color space (CS3) is an example of an output color space CS5.

Note that the first device dependent color space is also referred to as a first color space.

The input color space CS4 of the A2B table 611 is four-dimensional and includes four components ($C_i$, $M_i$, $Y_i$, $K_i$) along n=4 coordinate axes (the C axis, the M axis, the Y axis, and the K axis).

The output profile 620 is data specifying a correspondence relationship between Lab values ($L_j$, $a_j$, $b_j$) in the Lab color space (CS3) and cmyk values ($c_j$, $m_j$, $y_j$, $k_j$) in the cmyk color space (an example of the second device dependent color space CS2) corresponding to the inks used in the ink jet-type printer 200. In this case, grid points GD2 in the B2A table 621 are typically arranged in the Lab color space at substantially equal intervals in an L axis direction, an a axis direction, and a b axis direction. Here, the variable j is a variable identifying each grid point GD2 set in the Lab color space (CS3). The expression "cmyk color space" is used to distinguish the color space corresponding to the inks used in the printer 200 from the color space corresponding to the inks used in the target printing machine 300. The cmyk values are an example of second coordinate values. In a case where only the output profile 620 is used, the Lab color space (CS3) is an example of the input color space CS4, and the cmyk color space (CS2) is an example of the output color space CS5. A color reproduction region of the output color ($cmyk_p$) represented by the cmyk values depends on the printer 200. Therefore, even when Lab values ($L_j$, $a_j$, $b_j$) in the B2A table 621 represent a point outside the color reproduction region of the printer 200, the cmyk values ($c_j$, $m_j$, $y_j$, $k_j$) resulting from mapping to a color reproduction region of the printer 200 are associated with the Lab values ($L_j$, $a_j$, $b_j$).

Note that the second device dependent color space is also referred to as a second color space.

The input color space CS4 of the B2A table 621 is three-dimensional and includes three components ($L_j$, $a_j$, $b_j$) along n=3 coordinate axes (an L axis, an a axis, and a b axis).

The device link profile 630 is data specifying a correspondence relationship between CMYK values ($C_i$, $M_i$, $Y_i$, $K_i$) in the CMYK color space (CS1) and cmyk values ($c_i$, $m_i$, $y_i$, $k_i$) in the cmyk color space (CS2). In this case, each grid point GD1 in the device link table 631 is a corresponding grid point in the A2B table 611 of the input profile 610. Here, the variable i is a variable identifying each grid point GD1 set in the CMYK color space (CS1). Of course, each grid point in the device link table 631 may be different from a corresponding grid point GD1 in the A2B table 611 of the input profile 610. The device link profile 630 is acquired by merging the input profile 610 (particularly the A2B table 611) and the output profile 620 (particularly the B2A table 621). In the device link profile 630, the CMYK color space (CS1) is an example of the input color space CS4, and the cmyk color space (CS2) is an example of the output color space CS5.

Note that the color conversion table 601 included in each of the profiles 610, 620, and 630 is not limited to a single conversion table but may be a combination of a plurality of conversion tables such as a combination of a one-dimensional conversion table, a three- or four-dimensional conversion table, and a one-dimensional table. Hence, the color conversion tables 601 illustrated in FIG. 3 may directly illustrate three- or four-dimensional conversion tables included in the profiles 610, 620, and 630 or illustrate a combination of a plurality of conversion tables included in the profiles 610, 620, and 630.

Furthermore, the grid points mean virtual points arranged in the input color space, and output coordinate values corresponding to the position of each grid point in the input color space are assumed to be stored at the grid point. The technique includes not only even arrangement of a plurality of grid points in the input color space but also uneven arrangement of a plurality of grid points in the input color space.

The input color space CS4 of the device link table 631 is four-dimensional and includes four components ($C_i$, $M_i$, $Y_i$, $K_i$) along n=4 coordinate axes (the C axis, the M axis, the Y axis, and the K axis).

Figure 4:
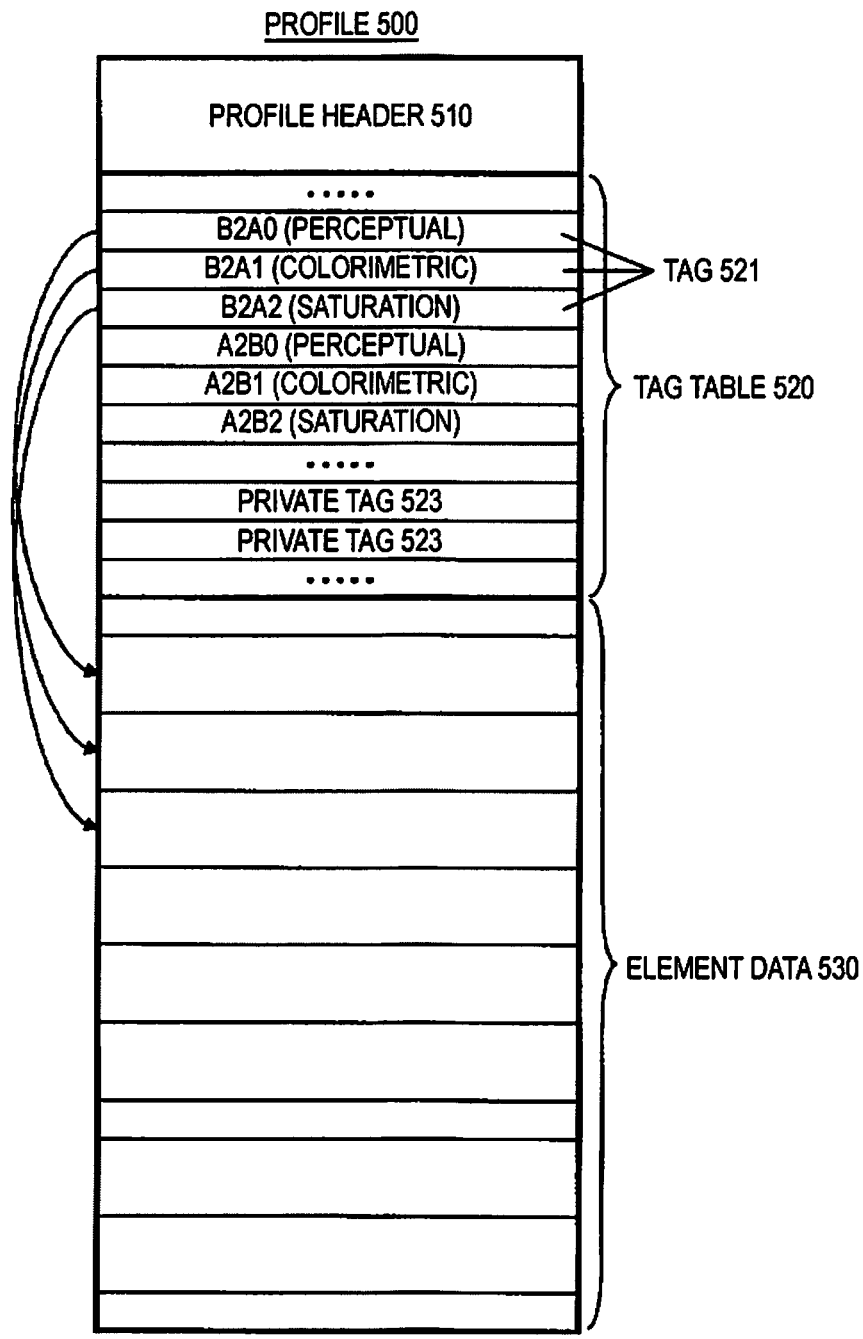
FIG. 4 is a diagram schematically illustrating a structure example of a profile.

FIG. 4 schematically illustrates the structure of the profile 500, particularly the input profile 610 and the output profile 620. The profile 500 illustrated in FIG. 4 is an ICC profile and includes a profile header 510 and a tag table 520. The profile 500 includes tags 521 that are information used to convert color information between the PCS and the device dependent color space. The tags 521 may include private tags 523 used to customize the profile 500.

A2Bx tags for the devices (300 and 200) (x illustrated in FIG. 4 is 0, 1, or 2) include, as element data 530, a color conversion table used to convert the device dependent color space (CMYK color space or cmyk color space) into the Lab color space. B2Ax tags for the devices (300 and 200) include, as the element data 530, a color conversion table used to convert the Lab color space into the device dependent color space (CMYK color space or cmyk color space).

An A2B0 tag and a B2A0 tag illustrated in FIG. 4 are information used for a Perceptual color conversion. The perceptual color conversion focuses on tone reproduction and is thus mostly used for a conversion of photographic images with a wide color gamut. The A2B1 tag and the B2A1 tag illustrated in FIG. 4 are information used for a media-relative colorimetric color conversion or an absolute colorimetric color conversion. The colorimetric color conversion is faithful to colorimetric values, and is thus mostly used for a conversion for digital-proof color calibration output for which accurate color matching is indispensable. An A2B2 tag and a B2A2 tag illustrated in FIG. 4 are information used for a color conversion focusing on saturation. The color conversion focusing on saturation focuses more on saturation of colors than on the accuracy of hue and is mostly used for a conversion of graph display and the like in business graphics.

Figure 5:
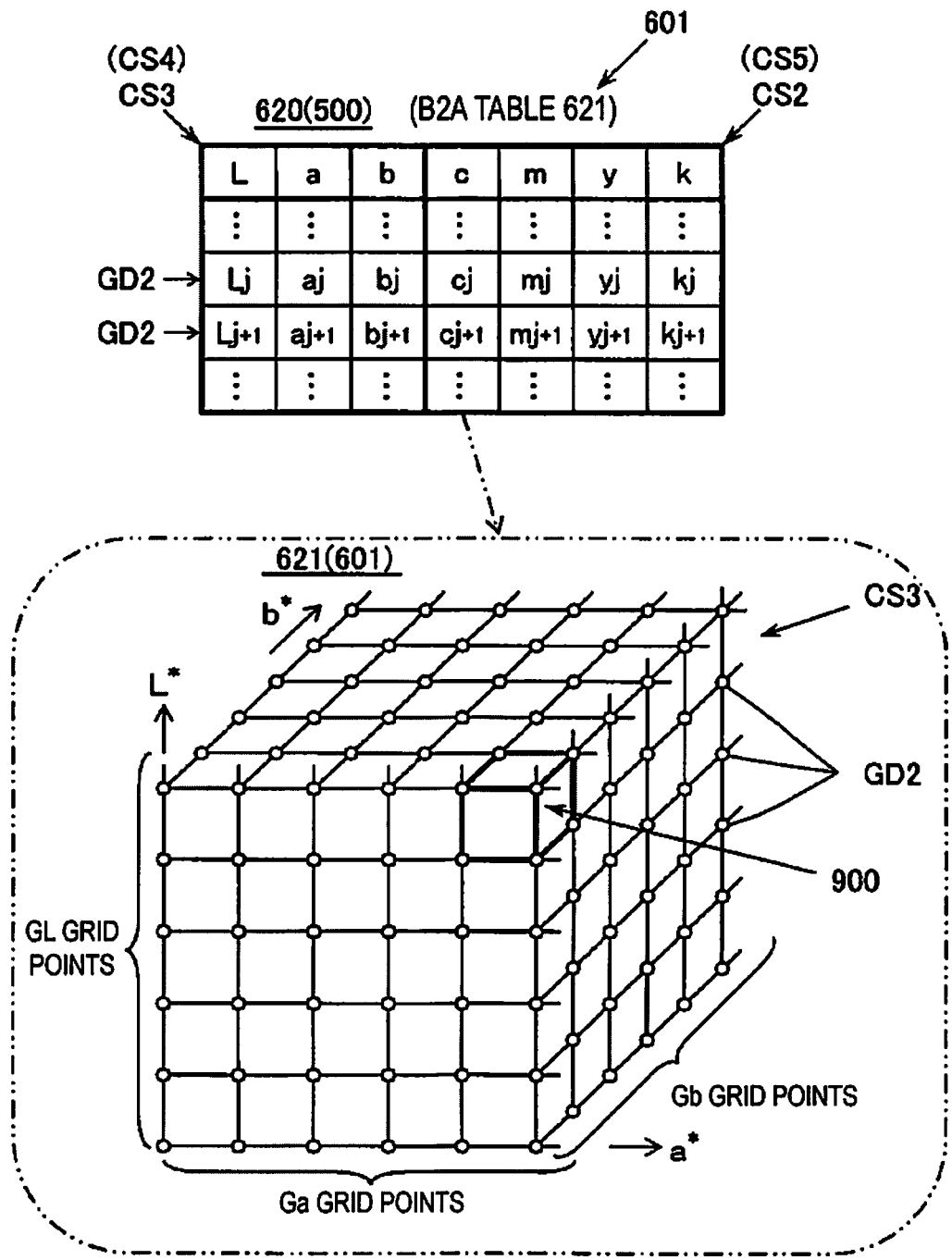
FIG. 5 is a block diagram schematically illustrating a structure example of a conversion table of a profile.

FIG. 5 is a block diagram schematically illustrating the structure of the B2A table 621 of the output profile 620 as a structure example of a conversion table of a profile. A lower portion of FIG. 5 schematically illustrates the positions of grid points GD2 in the Lab color space (CS3). The grid points GD2 in the three-dimensional B2A table 621 are typically arranged in the Lab color space at substantially equal intervals in the L axis direction, the a axis direction, and the b axis direction. In the lower portion of FIG. 5, GL denotes the number of grid points GD2 in the L axis direction, Ga denotes the number of grid points GD2 in the a axis direction, and Gb denotes the number of grid points GD2 in the b axis direction. The number of grid points in B2A table 621 is thus GL×Ga×Gb. Of course, at least any of the numbers of grid points in the respective axis directions may be different from GL, Ga, and Gb.

Although not illustrated in the drawings, the grid points GD1 in the A2B table 611 of the input profile 610 and in the device link table 631 of the device link profile 630 (see FIG. 3) are typically arranged in the CMYK color space (CS1) at substantially equal intervals in the C axis direction, the M axis direction, the Y axis direction, and the K axis direction. Assuming that the numbers of grid points GD1 in the C, M, Y, and K axis directions are respectively denoted by Gc, Gm, Gy, and Gk, Gc×Gm×Gy×Gk grid points are present in the four-dimensional A2B table 611 and in the device link table 631. Of course, at least any of the numbers of grid points in the respective axis directions may be different from Gc, Gm, Gy, and Gk.

5. SPECIFIC EXAMPLE OF COLOR CONVERSION INTERPOLATION METHOD

Now, a color conversion interpolation method will be described with reference to FIGS. 6A to 6D. FIGS. 6A to 6D are diagrams for schematically illustrating an example of N-point interpolation (N is an integer of 4 or larger) in the three-dimensional space. Here, in a case where a three-dimensional color conversion table is referenced that includes m=3 components along n=3 coordinate axes of the input color space CS4 as in the case of the B2A table 621, the three-dimensional spaces illustrated in FIGS. 6A to 6D are spaces with the m=3 components of the three-dimensional color conversion table as coordinates. In a case where a four-dimensional color conversion table is referenced that includes m=4 components along n=4 coordinate axes of the input color space CS4 as in the case of the A2B table 611 and the device link table 631, the three-dimensional spaces illustrated in FIGS. 6A to 6D are virtual spaces with three of the m=4 components of the four-dimensional color conversion table as coordinates. A grid 900 illustrated in FIGS. 6A to 6D is a hexahedron including, as vertexes, 2×2×2=8 grid points GD0, among which each 2 grid points are adjacent to each other in each axis direction of the three-dimensional input color space CS4 or the virtual space. FIG. 5 illustrates, by thick lines, the grid 900 including, as vertexes, 2×2×2=8 grid points included in the GL×Ga×Gb grid points GD2 of the B2A table 621 among which each 2 grid points are adjacent to each other in each axis direction of the Lab color space (CS3). In FIGS. 6A to 6D, blank circles represent the grid points GD0 in the color conversion table 601, and filled circles represent reference grid points GD10 that are included in the plurality of grid points GD0 and that are referenced during interpolation of output coordinate values in the output color space CS5. An upward blank triangular mark represents the position of input coordinate values Ip, and downward filled triangular marks represent adjustment points P0 described below. An interpolation range 700 that is a range within which output coordinate values corresponding to the input coordinate values Ip are interpolated is a range defined by a plurality of reference grid points surrounding the input coordinate values Ip, to divide the input color space CS4. The interpolation range corresponds to each shaded polyhedron in FIGS. 6A to 6D. N-point interpolation refers to an interpolation calculation based on the output coordinate values of the reference grid points GD10 and weight coefficients when output coordinate values are determined that correspond to the input coordinate values Ip of position included in the interpolation range 700.

Figure 6A:
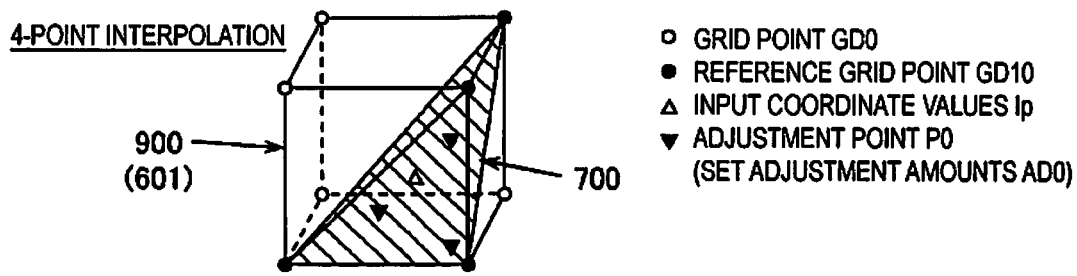
FIGS. 6A to 6D are diagrams for schematically illustrating an example of N-point interpolation of output coordinate values.
Figure 6B:
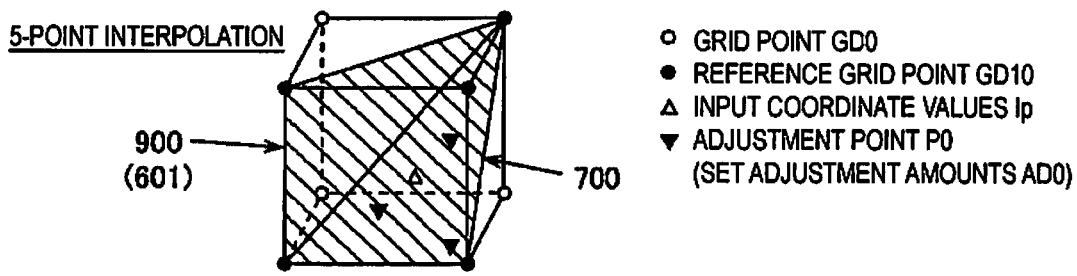
Figure 6C:
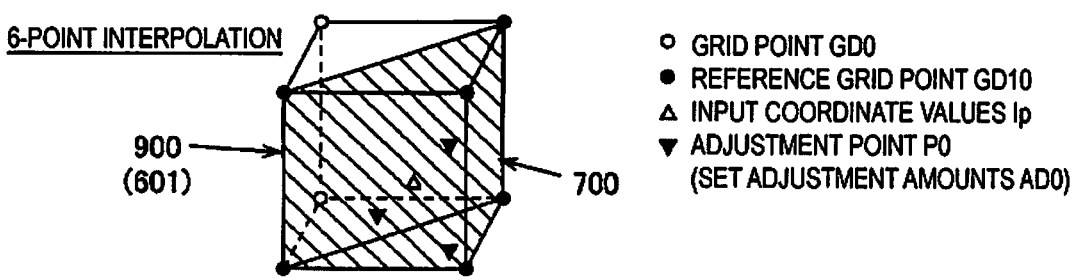
Figure 6D:
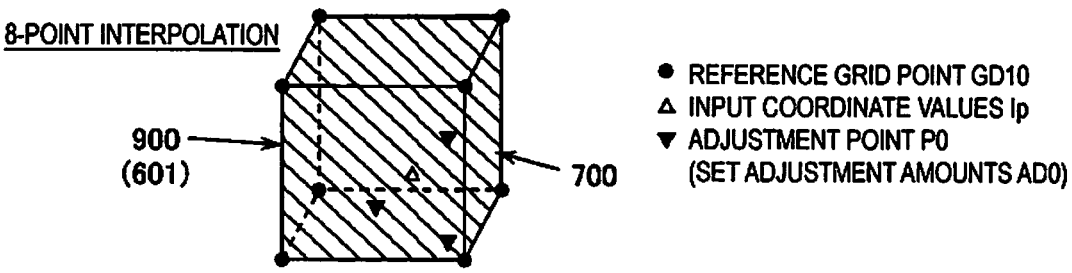

Four-point interpolation illustrated in FIG. 6A is also referred to as tetrahedral interpolation and uses the output coordinate values of $N_3=4$ reference grid points GD10 at vertexes of a trigonal pyramid (interpolation range 700) resulting from division of the grid 900 into six pieces, and weight coefficients. Five-point interpolation illustrated in FIG. 6B is also referred to as pyramid interpolation and uses the output coordinate values of $N_3=5$ reference grid points GD10 at vertexes of a quadrangular pyramid (interpolation range 700) included in the grid 900, and weight coefficients. Six-point interpolation illustrated in FIG. 6C is also referred to as triangular prismatic interpolation and uses the output coordinate values of $N_3=6$ reference grid points GD10 at vertexes of a triangular prism (interpolation range 700) resulting from division of the grid 900 into halves, and weight coefficients. Eight-point interpolation illustrated in FIG. 6D is also referred to as hexahedral interpolation and uses the output coordinate values of $N_3=8$ reference grid points GD10 at vertexes of the grid 900, which is a hexahedron (interpolation range 700), and weight coefficients.

The weight coefficient for each of the reference grid points GD10 may be determined using a well-known method. For example, assume that a distance from the position of the input coordinate values Ip to each reference grid point GD10 is denoted by Li. The variable i in this case is a variable that identifies the reference grid point GD10. In a case where any of the reference grid points GD10 has Li=0, the output coordinate values of the reference grid point GD10 with Li=0 may be set to the output coordinate values corresponding to the input coordinate values Ip. In a case where none of the reference grid points GD10 have Li=0, the sum of the reciprocals of the distances 1/Li is denoted by $S_{1/Li}$ and the weight for each reference grid point GD10 is denoted by $1/Li/S_{1/Li}$, and the sums of the output coordinate values of the reference grid points GD10 multiplied by the weights may be determined to be the output coordinate values corresponding to the input coordinate values Ip.

Of course, the weight coefficient may correspond to, e.g., a volume ratio of solids resulting from division, by planes passing through the position of the input coordinate values Ip, of a solid with the reference grid points GD10 as vertexes. For example, rectangular interpolation that is 8-point interpolation may include dividing the grid 900 into eight rectangular parallelepipeds by planes orthogonal to the axis directions of respective axes of the input color space, and determining the weight coefficient for each of the reference grid points GD10 to be the volume ratio between the diagonally located resultant rectangular parallelepipeds.

FIG. 7 is a diagram for schematically illustrating an example of N-point interpolation for a four-dimensional color conversion table. FIG. 7 illustrates an example of $N=2 \times N_3$ point interpolation for the A2B table 611 of the input profile 610.

An upper portion of FIG. 7 illustrates, by a filled triangular mark, the position of a set of input coordinate values Ip (Cp, Mp, Yp, Kp) on the K axis in the CMYK color space (CS1). The positions of grid points GD0 adjacent to the set of input coordinate values Ip in the K axis direction are denoted by K1 and K2. In this case, K1<K2.
Furthermore, $$(Kp-K1):(K2-Kp)=Kr:(1-Kr)$$

is satisfied. Here, $0 \leq Kr \leq 1$.

K fixed to K1 and K2 allows assumption of a three-dimensional virtual space expressed by the C axis, the M axis, and the Y axis. First, an $N_3=4$ interpolation calculation is assumed to be executed in a three-dimensional virtual space with K=K1 as illustrated on the left of middle of FIG. 7. In this case, this calculation may use the weight coefficients and the output coordinate values of the four reference grid points GD10 at the vertexes of the trigonal pyramid (interpolation range 700) resulting from division of the grid 900 into six pieces, as described above. The result of the calculation is to be used as Lab values (L1, a1, b1). Furthermore, an $N_3=4$ interpolation calculation is assumed to be executed in a three-dimensional virtual space with K=K2 as illustrated on the right of middle of FIG. 7. This calculation may also use the weight coefficients and the output coordinate values of the four reference grid points GD10 at the vertexes of the trigonal pyramid (interpolation range 700) resulting from division of the grid 900 into six pieces, as described above. The result of the calculation is assumed to be Lab values (L2, a2, b2).

The final output coordinate values (Lp, ap, bp) corresponding to the input coordinate values Ip may be determined by apply weights corresponding to the position of the input coordinate values Ip on the K axis.

$$Lp=(1-Kr) \times L1 + Kr \times L2$$

$$ap=(1-Kr) \times a1 + Kr \times a2$$

$$bp=(1-Kr) \times b1 + Kr \times b2$$

Besides the $N=2 \times 4$-point interpolation calculation, an $N=2 \times 5$-point interpolation calculation, an $N=2 \times 6$-point interpolation calculation, an $N=2 \times 8$-point interpolation calculation, or the like may be used as the interpolation calculation for the four-dimensional color conversion table. The $N=2 \times 5$-point interpolation calculation can be executed, for example, by using the output coordinate values and the weight coefficients for the $N_3=5$ reference grid points GD10 illustrated in FIG. 6B for K=K1 and K2. The $N=2 \times 6$-point interpolation calculation can be executed, for example, by using the output coordinate values and the weight coefficients for the $N_3=6$ reference grid points GD10 illustrated in FIG. 6C for K=K1 and K2. The $N=2 \times 8$-point interpolation calculation can be executed, for example, by using the output coordinate values and the weight coefficients for the $N_3=8$ reference grid points GD10 illustrated in FIG. 6D for K=K1 and K2.

Furthermore, besides the $N_3$-point interpolation calculation in the three-dimensional virtual space with the fixed K value, an interpolation calculation may be executed by selecting N reference grid points surrounding the input coordinate values Ip in the four-dimensional color conversion table.

Of course, besides the A2B table 611, the four-dimensional color conversion table such as the device link table 631 or the A2B table of the output profile 620 may similarly be used for the interpolation calculation.

6. SPECIFIC EXAMPLE OF COLOR CONVERSION TABLE ADJUSTMENT PROCESS

FIG. 8 illustrates a color conversion table adjustment process to be executed by the host apparatus 100 illustrated in FIG. 1. Note that the host apparatus 100 executes a plurality of processes in parallel based on multitasking. The processes illustrated in this specific example may be properly changed, e.g., reordered. Here, step S111 corresponds to the adjustment point acceptance step ST1, the adjustment point acceptance function FU1, and the adjustment point acceptance unit U1. Step S112 and S120 correspond to the set adjustment amount acquisition step ST2, the set adjustment amount acquisition function FU2, and the set adjustment amount acquisition unit U2. Step S122 corresponds to the grid point adjustment amount determination step ST3, the grid point adjustment amount determination function FU3, and the grid point adjustment amount determination unit U3. Step S124 corresponds to the adjustment step ST4, the adjustment function FU4, and the adjustment unit U4. The term "step" is omitted from the description below. FIG. 9 illustrates an example of a User Interface (UI) screen 800 displayed in step S102 in FIG. 8.

When the color conversion table adjustment process is started, the host apparatus 100 causes the display apparatus 130 to display the UI screen 800, illustrated in FIG. 9 (S102). The UI screen 800 includes an input profile selection section 811, an output profile selection section 812, a device link profile selection section 813, a to-be-adjusted profile specification section 820, a to-be-adjusted color space selection section 830, a target acceptance area 840, a "specify based on image" button 841, an add button 842, a delete button 843, an adjustment data selection section 845, a chart print button 846, a colorimetry button 847, an intent specification section 860, an adjustment execute button 870, a history load button 881, and a history save button 882.

The host apparatus 100 accepts operations on any of the above-described sections and buttons through the input device 115 (S110), and when accepting an operation on the adjustment execution button 870, advances the process to S120. The process in S110 includes the following processes S111 and S112.

(S111) The adjustment point acceptance process of accepting settings for an adjustment point P0 corresponding to a to-be-adjusted color. This process enables a plurality of adjustment points P0 to be accepted within one interpolation range 700 as illustrated in FIGS. 6A to 6D and FIG. 7.

(S112) The target acceptance process of accepting an input of an adjustment target T0 for each adjustment point P0.

When accepting an operation through the input device 115 on the input profile selection section 811, the host apparatus 100 can cause the display apparatus 130 to display a list of the input profiles 610 stored in the storage device 114. The host apparatus 100 accepts, from the input device 115, one input profile in the displayed list of the input profiles 610 for color conversion as a profile for color conversion.

When accepting an operation on the output profile selection section 812 through the input device 115, the host apparatus 100 can cause the display apparatus 130 to display a list of the output profiles 620 stored in the storage device 114. The host apparatus 100 accepts, from the input device 115, one output profile in the displayed list of the output profiles 620 as a profile for color conversion.

When accepting an operation on the device link profile selection section 813 through the input device 115, the host apparatus 100 can cause the display apparatus 130 to display a list of the device link profiles 630 stored in the storage device 114. The host apparatus 100 accepts, from the input device 115, one device link profile in the displayed list of the device link profiles 630 as a profile for color conversion.

In the to-be-adjusted profile specification section 820, the host apparatus 100 accepts, from the input device 115, one of the input profile 610, the output profile 620, and the device link profile 630 as a to-be-adjusted profile 550. The host apparatus 100 may disable selection of a profile in any of the selection sections 811 to 813 in which no operation has been accepted.

In the to-be-adjusted color space selection section 830, the host apparatus 100 accepts, from the input device 115, one of the CMYK color space (CS1), the cmyk color space (CS2), and the Lab color space (CS3) as a to-be-adjusted color space. The host apparatus 100 may disable selection of the cmyk color space (CS2) in a case where an operation has been accepted only in the input profile selection section 811 and may disable selection of the CMYK color space (CS1) in a case where an operation has been accepted only in the output profile selection section 812.

The host apparatus 100 executes a process for changing the input item of the target acceptance area 840 according to the selection in the to-be-adjusted color space selection section 830. Furthermore, the host apparatus 100 executes a process for changing the input item of the target acceptance area 840 according to the selection in the adjustment data selection section 845. In the adjustment data selection section 845, either one of "absolute value" and "relative value" can be selected. The "absolute value" is an option allowing the adjustment target T0 to be accepted as a coordinate value in the color space. The "relative value" is an option allowing the adjustment target T0 to be accepted as a difference from the current coordinate value in the color space.

First, in a case where the specification of the "PCS value" (PCS CS3) in the adjustment data selection section 845 is accepted, the following process is executed.

When accepting the "relative value" in the adjustment data selection section 845, the host apparatus 100 causes an input section for the coordinate values (ΔL, Δa, Δb) of the adjustment target T0, as relative values (denoted by $\Delta Lab_{T\text{-}p}$) relative to the current coordinate values in the PCS CS3, to be displayed in the target acceptance area 840, as illustrated in FIG. 9. In this case, the host apparatus 100 accepts, in the input section, relative values $\Delta Lab_{T\text{-}p}$ (ΔL, Δa, Δb) of the adjustment target T0. Furthermore, when accepting the "absolute value" in the adjustment data selection section 845, the host apparatus 100 causes an input section for the coordinate values (denoted by T_L, T_a, T_b) of the adjustment target T0 along with a display section for the current coordinate values (denoted by C_L, C_a, C_b) in the PCS CS3 to be displayed in the target acceptance area 840. In this case, the host apparatus 100 accepts, in the input section, absolute values (T_L, T_a, T_b) of the adjustment target T0.

In a case where the specification of the "input data" (CMYK color space (CS1)) in the adjustment data selection section 845 is accepted, the following process is executed.

When accepting the "relative value" in the adjustment data selection section 845, the host apparatus 100 causes an input section for the coordinate values (denoted by ΔC, ΔM, ΔY, ΔK) of the adjustment target T0 as relative values (denoted by $\Delta CMYK_{T\text{-}p}$) relative to the current coordinate values in the CMYK color space (CS1), to be displayed in the target acceptance area 840. In this case, the host apparatus 100 accepts, in the input section, relative values $\Delta CMYK_{T\text{-}p}$ (ΔC, ΔM, ΔY, ΔK) of the adjustment target T0. Furthermore, when accepting the "absolute value" in the adjustment data selection section 845, the host apparatus 100 causes an input section for the coordinate values (denoted by T_C, T_M, T_Y, T_K) of the adjustment target T0 along with a display section for the current coordinate values (denoted by C_C, C_M, C_Y, C_K) in the CMYK color space (CS1) to be displayed in the target acceptance area 840. In this case, the host apparatus 100 accepts, in the input section, absolute values (T_C, T_M, T_Y, T_K) of the adjustment target T0.

In a case where the specification of the "output data" (cmyk color space (CS2)) in the adjustment data selection section 845 is accepted, the following process is executed.

When accepting the "relative value" in the adjustment data selection section 845, the host apparatus 100 causes an input section for the coordinate values (denoted by Δc, Δm, Δy, Δk) of the adjustment target T0 as relative values (denoted by $\Delta \mathrm{cmyk}_{T\text{-}p}$) relative to the current coordinate values in the cmyk color space (CS2) to be displayed in the target acceptance area 840. In this case, the host apparatus 100 accepts, in the input section, relative values $\Delta \mathrm{cmyk}_{T\text{-}p}$ (Δc, Δm, Δy, Δk) of the adjustment target T0. Furthermore, when accepting the "absolute value" in the adjustment data selection section 845, the host apparatus 100 causes an input section for the coordinate values (denoted by T_c, T_m, T_y, T_k) of the adjustment target T0 along with a display section for the current coordinate values (denoted by C_c, C_m, C_y, C_k) in the cmyk color space (CS2) to be displayed in the target acceptance area 840. In this case, the host apparatus 100 accepts, in the input section, absolute values (T_c, T_m, T_y, T_k) of the adjustment target T0.

The adjustment point P0 for which the adjustment target T0 is to be set is set in, e.g., the CMYK color space (CS1). For example, when accepting an operation on the "specify based on image" button 841 in the UI screen 800 illustrated in FIG. 9, the host apparatus 100 causes the display apparatus 130 to display a screen schematically depicting the CMYK color space (CS1), and acquires CMYK values corresponding to an operation through the input device 115 to update the information of the adjustment target T0 in the target acceptance area 840. When a new adjustment point P0 is specified, the host apparatus 100 provides a corresponding ID (identification information) and causes the acquired CMYK values, Lab values obtained from the CMYK values, and the like to be displayed in the target acceptance area 840 in association with the ID. When the add button 842 is operated, the host apparatus 100 provides an additional ID, and adds, to the target acceptance area 840, an input section corresponding to the added ID. When the delete button 843 is operated, the host apparatus 100 accepts a specification of an ID to be deleted, and deletes the input section corresponding to the specified ID.

As described above, the host apparatus 100 is capable of executing the adjustment point acceptance process of accepting the settings for the adjustment point P0 (S111) to accept a plurality of adjustment points P0 within one interpolation range 700.

When accepting an operation on the chart print button 846, the host apparatus 100 generates print data of the color chart CH1 with color patches each representing the color of corresponding adjustment point P0 and transmits the print data to the printer 200. The printer 200 receives the print data and then prints, on the print substrate ME1, the color chart CH1 with the color patches each representing the color of corresponding adjustment point P0.

When accepting an operation on the colorimetry button 847, the host apparatus 100 instructs the colorimetric apparatus 120 to execute a colorimetric process on each patch of the color chart CH1. The colorimetric apparatus 120 receives the instruction, then executes a colorimetric process on each patch of the color chart CH1, and transmits the colorimetric values ($\mathrm{Lab}_p$) of each patch to the host apparatus 100. The host apparatus 100 receives the colorimetric values ($\mathrm{Lab}_p$) and may then cause the display apparatus 130 to display the colorimetric values ($\mathrm{Lab}_p$) or cause the printer 200 to print the colorimetric values ($\mathrm{Lab}_p$). A user may view the output colorimetric values ($\mathrm{Lab}_p$) and input the adjustment target T0 to the target acceptance area 840. Furthermore, the host apparatus 100 may automatically input the colorimetric values ($\mathrm{Lab}_p$) of each patch to an input section for the target T0. In a case where the adjustment target T0 is the relative value (ΔL, Δa, Δb), the host apparatus 100 may calculate differences between the components L, a, and b of the target colorimetric values $\mathrm{Lab}_T$ and the components L, a, and b of the current colorimetric values $\mathrm{Lab}_p$ and automatically input the differences to the input section for the target T0.

As described above, the host apparatus 100 executes the target acceptance process of accepting an input of the adjustment target T0 for each adjustment point P0 (S112).

When accepting an operation on the history load button 881, the host apparatus 100 reads an adjustment history stored in the storage device 114, and adds the adjustment history to the target acceptance area 840. When an operation on the history save button 882 is accepted, the host apparatus 100 stores the information of the target acceptance area 840 in the storage device 114 as an adjustment history.

The host apparatus 100 accepts, in the intent specification section 860, a specification of a rendering intent for defining the correspondence relationship for the to-be-adjusted profile 550. Although illustration is omitted in the drawing, a plurality of specification items for the intent specification section 860 illustrated in FIG. 9 are three types of items: "Perceptual", "Relative Colorimetric", and "Saturation". Of course, the specification items may include "Absolute Colorimetric", or any of "Perceptual", "Relative Colorimetric", and "Saturation" may be omitted from the specification items. FIG. 9 illustrates an example where "Perceptual" is specified as a specified intent.

When accepting an operation on the adjustment execute button 870 illustrated in FIG. 9, the host apparatus 100 executes a process in S120 and the subsequent steps in FIG. 8. Here, in a case where "Perceptual" is specified in the intent specification section 860, the host apparatus 100 uses, in the process in S120 and the subsequent steps, information in the profile 500 based on a perceptual color conversion (e.g., the information indicated by the A2B0 tag and the B2A0 tag illustrated in FIG. 4). In a case where "Relative Colorimetric" is specified in the intent specification section 860, the host apparatus 100 uses, in the process in S120 and the subsequent steps, information in the profile 500 based on a relative colorimetric color conversion (e.g., the information indicated by the A2B1 tag and the B2A1 tag illustrated in FIG. 4). In a case where "Saturation" is specified in the intent specification section 860, the host apparatus 100 uses, in the process in S120 and the subsequent steps, information in the profile 500 based on a color conversion focusing on saturation (e.g., the information indicated by the A2B2 tag and the B2A2 tag illustrated in FIG. 4).

First, the host apparatus 100 acquires set adjustment amounts AD0 representing amounts of adjustment for each of the accepted adjustment points P0 in the output color space CS5 of the to-be-adjusted profile 550 (S120).

In a case where the to-be-adjusted profile 550 is the input profile 610, the output color space CS5 is the Lab color space (CS3). The host apparatus 100 thus acquires the set adjustment amounts AD0 for the Lab color space (CS3).

Here, in a case where the to-be-adjusted color space is the Lab color space (CS3), the set adjustment amounts AD0 are the relative values $\Delta \mathrm{Lab}_{T\text{-}p}$ (ΔL, Δa, Δb) of the adjustment target T0. When the absolute values (T_L, T_a, T_b) are accepted in the input section for the adjustment target T0, the relative values $\Delta \mathrm{Lab}_{T\text{-}p}$ (T_L−C_L, T_a−C_a, T_b−C_b) may be calculated.

In a case where the to-be-adjusted color space is the CMYK color space (CS1), the set adjustment amounts AD0 are obtained in accordance with the A2B table 611 of the input profile 610. First, the current coordinate values (C_C, C_M, C_Y, C_K) of the adjustment point P0 are converted into the current coordinate values (C_L, C_a, C_b) in the Lab color space (CS3) in accordance with the A2B table 611. Furthermore, the absolute values (T_C, T_M, T_Y, T_K) of the adjustment target T0 are converted into the absolute values (T_L, T_a, T_b) in the Lab color space (CS3) in accordance with the A2B table 611. The set adjustment amounts AD0 are the relative values $\Delta Lab_{T\text{-}p}$ (T_L−C_L, T_a−C_a, T_b−C_b) of the adjustment target T0. When the relative values $\Delta CMYK_{T\text{-}p}$ ($\Delta C$, $\Delta M$, $\Delta Y$, $\Delta K$) are accepted in the input section for the adjustment target T0, the absolute values (C_C+$\Delta C$, C_M+$\Delta M$, C_Y+$\Delta Y$, C_K+$\Delta K$) may be calculated, and then, the set adjustment amounts AD0 may be calculated as described above.

In a case where the output profile 620 is selected for color conversion and the to-be-adjusted color space is the cmyk color space, the set adjustment amounts AD0 are obtained in accordance with the A2B table of the output profile 620. First, the current coordinate values (C_c, C_m, C_y, C_k) of the adjustment point P0 are converted into the current coordinate values (C_L, C_a, C_b) in the Lab color space (CS3) in accordance with the A2B table. Furthermore, the absolute values (T_c, T_m, T_y, T_k) of the adjustment target T0 are converted into the absolute values (T_L, T_a, T_b) in the Lab color space (CS3) in accordance with the A2B table. The set adjustment amounts AD0 are the relative values $\Delta Lab_{T\text{-}p}$ (T_L−C_L, T_a−C_a, T_b−C_b) of the adjustment target T0. When the relative values $\Delta cmyk_{T\text{-}p}$ ($\Delta c$, $\Delta m$, $\Delta y$, $\Delta k$) are accepted in the input section for the adjustment target T0, the absolute values (C_c+$\Delta c$, C_m+$\Delta m$, C_y+$\Delta y$, C_k+$\Delta k$) may be calculated, and then, the set adjustment amounts AD0 may be calculated as described above.

In a case where the to-be-adjusted profile 550 is the output profile 620, the output color space CS5 is the cmyk color space (CS2). The host apparatus 100 thus acquires the set adjustment amounts AD0 for the cmyk color space (CS2).

Here, in a case where the to-be-adjusted color space is the cmyk color space (CS2), the set adjustment amounts AD0 are the relative values $\Delta cmyk_{T\text{-}p}$ ($\Delta c$, $\Delta m$, $\Delta y$, $\Delta k$) of the adjustment target T0. When the absolute values (T_c, T_m, T_y, T_k) are accepted in the input section for the adjustment target T0, the relative values $\Delta cmyk_{T\text{-}p}$ (T_c−C_c, T_m−C_m, T_y−C_y, T_k−C_k) may be calculated.

In a case where the to-be-adjusted color space is the Lab color space (CS3), the set adjustment amounts AD0 are obtained in accordance with the B2A table 621 of the output profile 620. First, the current coordinate values (C_L, C_a, C_b) of the adjustment point P0 are converted into the current coordinate values (C_c, C_m, C_y, C_k) in the cmyk color space (CS2) in accordance with the B2A table 621. Furthermore, the absolute values (T_L, T_a, T_b) of the adjustment target T0 are converted into the absolute values (T_c, T_m, T_y, T_k) in the cmyk color space (CS2) in accordance with the B2A table 621. The set adjustment amounts AD0 are the relative values $\Delta cmyk_{T\text{-}p}$ (T_c−C_c, T_m−C_m, T_y−C_y, T_k−C_k) of the adjustment target T0. When the relative values $\Delta Lab_{T\text{-}p}$ ($\Delta L$, $\Delta a$, $\Delta b$) are accepted in the input section for the adjustment target T0, the absolute values (C_L+$\Delta L$, C_a+$\Delta a$, C_b+$\Delta b$) may be calculated, and then, the set adjustment amounts AD0 may be calculated as described above.

In a case where the input profile 610 is also selected for color conversion and the to-be-adjusted color space is the CMYK color space, the set adjustment amounts AD0 are obtained in accordance with the A2B table 611 of the input profile 610 and the B2A table 621 of the output profile 620. First, the current coordinate values (C_C, C_M, C_Y, C_K) of the adjustment point P0 are converted into the current coordinate values (C_c, C_m, C_y, C_k) in the cmyk color space (CS2) in accordance with the A2B table 611 and the B2A table 621. Furthermore, the absolute values (T_C, T_M, T_Y, T_K) of the adjustment target T0 are converted into the absolute values (T_c, T_m, T_y, T_k) in the cmyk color space (CS2) in accordance with the A2B table 611 and the B2A table 621. The set adjustment amounts AD0 are the relative values $\Delta cmyk_{T\text{-}p}$ (T_c−C_c, T_m−C_m, T_y−C_y, T_k−C_k) of the adjustment target T0. When the relative values $\Delta CMYK_{T\text{-}p}$ ($\Delta C$, $\Delta M$, $\Delta Y$, $\Delta K$) are accepted in the input section for the adjustment target T0, the absolute values (C_C+$\Delta C$, C_M+$\Delta M$, C_Y+$\Delta Y$, C_K+$\Delta K$) may be calculated, and then, the set adjustment amounts AD0 may be calculated as described above.

In a case where the to-be-adjusted profile 550 is the device link profile 630, the output color space CS5 is the cmyk color space (CS2). The host apparatus 100 thus acquires the set adjustment amounts AD0 for the cmyk color space (CS2).

Here, in a case where the to-be-adjusted color space is the cmyk color space (CS2), the set adjustment amounts AD0 are the relative values $\Delta cmyk_{T\text{-}p}$ ($\Delta c$, $\Delta m$, $\Delta y$, $\Delta k$) of the adjustment target T0. When the absolute values (T_c, T_m, T_y, T_k) are accepted in the input section for the adjustment target T0, the relative values $\Delta cmyk_{T\text{-}p}$ (T_c−C_c, T_m−C_m, T_y−C_y, T_k−C_k) may be calculated.

In a case where the to-be-adjusted color space is the CMYK color space, the set adjustment amounts AD0 are obtained in accordance with the device link table 631 of the device link profile 630. First, the current coordinate values (C_C, C_M, C_Y, C_K) of the adjustment point P0 are converted into the current coordinate values (C_c, C_m, C_y, C_k) in the cmyk color space (CS2) in accordance with the device link table 631. Furthermore, the absolute values (T_C, T_M, T_Y, T_K) of the adjustment target T0 are converted into the absolute values (T_c, T_m, T_y, T_k) in the cmyk color space (CS2) in accordance with the device link table 631. The set adjustment amounts AD0 are the relative values $\Delta cmyk_{T\text{-}p}$ (T_c−C_c, T_m−C_m, T_y−C_y, T_k−C_k) of the adjustment target T0. When the relative values $\Delta CMYK_{T\text{-}p}$ ($\Delta C$, $\Delta M$, $\Delta Y$, $\Delta K$) are accepted in the input section for the adjustment target T0, the absolute values (C_C+$\Delta C$, C_M+$\Delta M$, C_Y+$\Delta Y$, C_K+$\Delta K$) may be calculated, and then, the set adjustment amounts AD0 may be calculated.

In most cases, the set adjustment point P0 matches none of the grid points GD0 in the color conversion table 601 of the to-be-adjusted profile 550. Thus, when a color conversion is executed on the adjustment point P0, a plurality of grid points surrounding the adjustment point P0 are referenced. In this specific example, grid points referenced when the output coordinate values of the adjustment point P0 are interpolated are referred to as reference grid points GD10.

Again, with reference to FIG. 8, the description is continued. After the host apparatus 100 acquires the set adjustment amounts AD0, the host apparatus 100 determines, by using the set adjustment amounts AD0 for each adjustment point P0, grid point adjustment amounts AD10 representing amounts of adjustment for each reference grid point GD10 (S122). The input color space CS4 of the color conversion table 601 included in the to-be-adjusted profile 550 is typically three- or four-dimensional. However, for easy-to-understand description of the concept of algorithms, first, the input color space of the color conversion table is assumed to be one-dimensional.

Figure 10A:
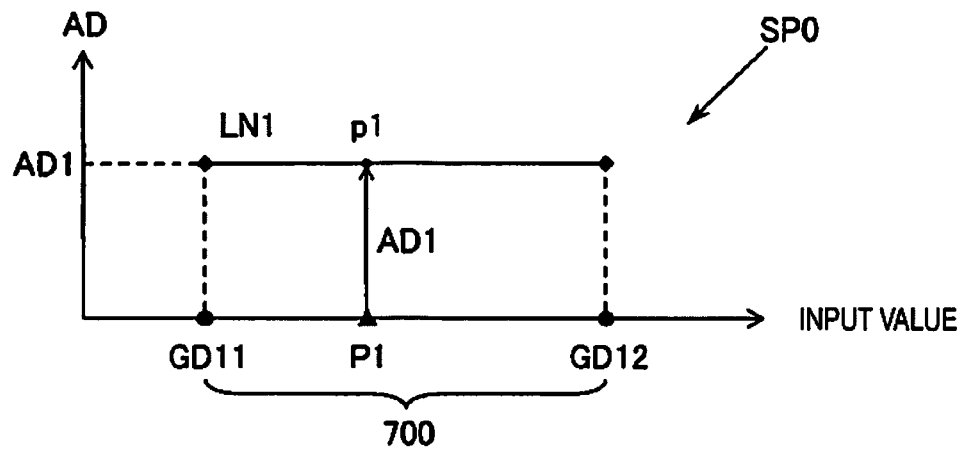
FIGS. 10A to 10C are diagrams schematically illustrating an example where grid point adjustment amounts are determined in a case where a color conversion table is assumed to be one-dimensional.
Figure 10B:
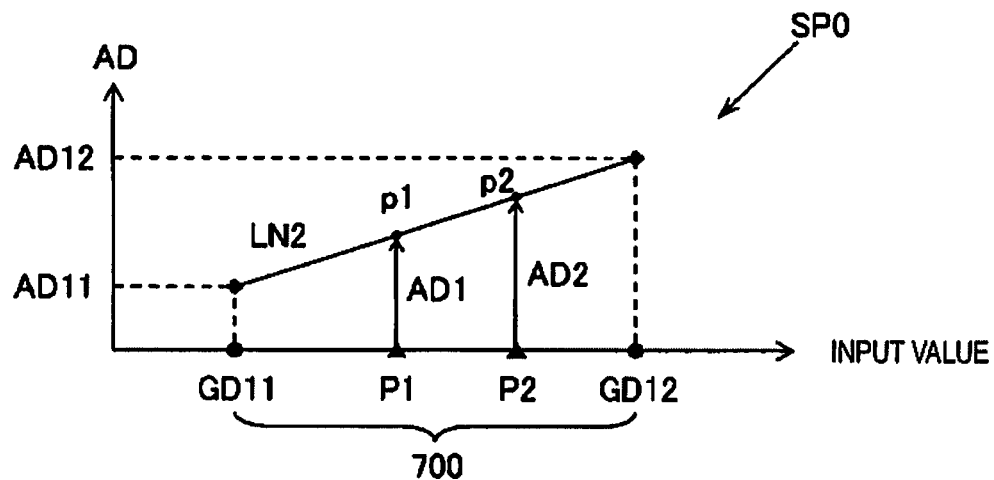
Figure 10C:
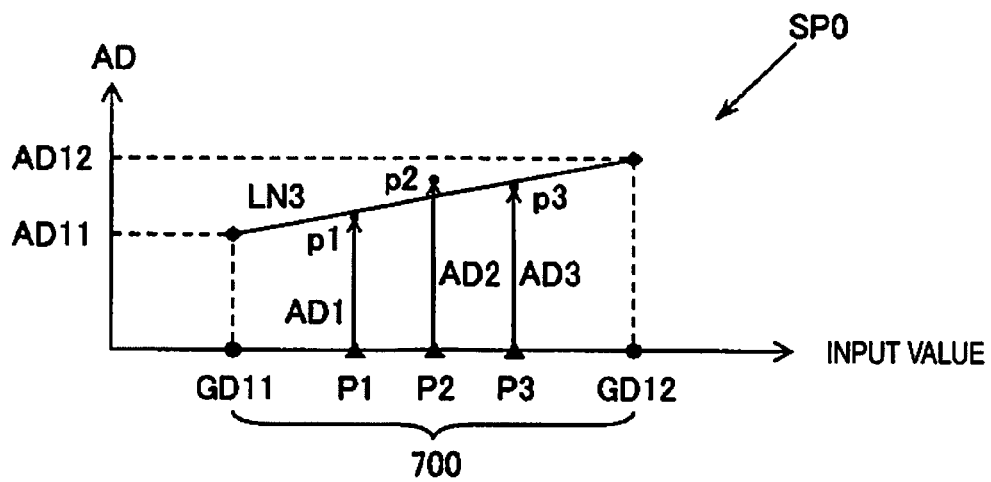

FIGS. 10A to 10C are diagrams schematically illustrating an example where the grid point adjustment amounts AD10 are determined in a case where a color conversion table of the to-be-adjusted profile is assumed to be one-dimensional. Here, the horizontal axis indicates a certain coordinate axis of the color conversion table 601, and the vertical axis indicates the adjustment amount AD representing the amount by which the value is adjusted. For example, in a case where the color conversion table 601 is the B2A table 621 of the output profile 620, the horizontal axis is the L axis, the a axis, or the b axis. Furthermore, reference grid points GD11 and GD12 are illustrated as the reference grid points GD10 located at the ends(vertexes) of the interpolation range 700, adjustment points P1, P2, and P3 are illustrated as adjustment points P0 present within the interpolation range 700, and set adjustment amounts AD1, AD2, and AD3 are respectively illustrated as set adjustment amounts AD0 for the adjustment points P1, P2, and P3. Since the input color space of the color conversion table is assumed to be one-dimensional, the interpolation range 700 is on the coordinate axis between the reference grid points GD11 and GD12. A two-dimensional plane including a one-dimensional coordinate axis and an additional coordinate axis for the adjustment amount AD corresponds to the virtual space SP0 according to the technique.

In a case where the interpolation range 700 includes only one adjustment point P1 as illustrated in FIG. 10A, a line LN1 passing through a position p1 of an adjustment amount AD=AD1 at an input value corresponding to the adjustment point P1 may have any of various slopes. In this case, the slope of the line LN1 is assumed to be 0, and adjustment amounts AD=AD1 for the positions of the reference grid points GD11 and GD12 are assumed to be determined to be grid point adjustment amounts AD10. In other words, intersections between the line LN1 with a slope of 0 and lines passing through the reference grid points GD11 and GD12 along the coordinate axis of the adjustment amount AD are determined, and the adjustment amounts AD for the intersections are determined to be the grid point adjustment amounts AD10.

In a case where the interpolation range 700 includes two adjustment points P1 and P2 as illustrated in FIG. 10B, a line LN2 is uniquely determined that passes through a coordinate p1 of an adjustment amount AD=AD1 at an input value corresponding to the adjustment point P1 and a coordinate p2 of an adjustment amount AD=AD2 at an input value corresponding to the adjustment point P2. In this case, the line passing through the coordinates p1 and p2 is determined, intersections between the line LN2 and lines passing through the reference grid points GD11 and GD12 along the coordinate axis of the adjustment amount AD are determined, and the adjustment amounts AD for the intersections are determined to be grid point adjustment amounts AD11 and AD12.

In a case where the interpolation range 700 includes three adjustment points P1, P2, and P3 as illustrated in FIG. 10C, the following coordinates are present: a coordinate p1 of an adjustment amount AD=AD1 at an input value corresponding to the adjustment point P1, a coordinate p2 of an adjustment amount AD=AD2 at an input value corresponding to the adjustment point P2, and a coordinate p3 of an adjustment amount AD=AD3 at an input value corresponding to the adjustment point P3. In this case, a line LN3 compatible with the coordinates p1, p2, and p3 are determined by the least squares method, intersections between the line LN3 and lines passing through the reference grid points GD11 and GD12 along the coordinate axis of the adjustment amount AD are determined, and the adjustment amounts AD for the intersections are determined to be the grid point adjustment amounts AD11 and AD12. Even in a case where the interpolation range 700 includes four or more adjustment amounts, the grid point adjustment amounts AD11 and AD12 may similarly be determined.

The actual input color space CS4 of the color conversion table 601 is typically three- or four-dimensional. In a case where the input color space CS4 of the color conversion table 601 is n=3-dimensional, an interpolation range 700 for dividing, defined by a plurality of reference grid points GD10 surrounding the adjustment point P0 as illustrated in FIGS. 6A to 6D is set to correspond to a linear interpolation range 700 illustrated in FIGS. 10A to 10C. Here, m+1=4-dimensional virtual space SP0 is assumed that includes components along n=3 coordinate axes directly used as m=3 components and the adjustment amounts AD also used as a component. In a case where the color conversion table 601 is n=4-dimensional, an interpolation range 700 defined by a plurality of reference grid points GD10 surrounding the adjustment point P0 in virtual three-dimensional spaces with fixed K values as illustrated in FIG. 7 is set to correspond to a linear interpolation range 700 illustrated in FIGS. 10A to 10C. Here, m+1=4-dimensional virtual space SP0 is assumed that includes m=3 components corresponding to the components along n=4 coordinate axes other than the components along the K axis and the adjustment amounts AD also used as a component.

In the description below, the interpolation range 700 is a hexahedron with eight reference grid points GD10 as vertexes as illustrated in FIG. 6D. Of course, even in a case where the interpolation range 700 is a solid with a plurality of reference grid point GD10 as vertexes as illustrated in FIGS. 6A to 6C, the grid point adjustment amounts AD10 may similarly be determined.

In the four-dimensional virtual space SP0, the interpolation range 700 is expressed as a three-dimensional hyperplane. Thus, intersections between the hyperplane and lines passing through the reference grid points GD10 along the coordinate axes of the adjustment amounts AD are determined, and then, the adjustment amounts AD for the intersections may be determined to be the grid point adjustment amounts AD10.

FIG. 11 illustrates the grid point adjustment amount determination process executed in S122 in FIG. 8. When this process is started, the host apparatus 100 branches the process depending on the number of adjustment points P0 accepted within the interpolation range 700 (S202). In a case where m+1=4 or less adjustment points P0 are accepted within the interpolation range 700, the host apparatus 100 determines data representing a hyperplane passing through positions with coordinates corresponding to the m components and the set adjustment amounts AD0 for each adjustment point P0 in the virtual space SP0 (S204 to S210), and advances the process to S214. In a case where m+2=5 or more adjustment points P0 are accepted within the interpolation range 700, the host apparatus 100 uses the least squares method to determine data representing a hyperplane in the virtual space SP0 (S212), and advances the process to S214.

Here, the m=3 components are denoted by x, y, and z, and the adjustment amounts AD are denoted by w. "P0" may be used as an index to represent, as $(x_{P0}, y_{P0}, z_{P0}, w_{P0})$, the coordinates (denoted by p0) of the adjustment point P0 in the virtual space SP0. Among the coordinates, $x_{P0}$, $y_{P0}$, and $z_{P0}$ are values representing the position of the adjustment point P0, and $w_{P0}$ is the set adjustment amounts AD0.

Furthermore, the hyperplane adapted to the adjustment point P0 in the virtual space SP0 is expressed by the following equation.

$$w = ax + by + cz + d \quad (1)$$

In the equation, a in this case is a coefficient for the component x, b in this case is a coefficient for the component y, c in this case is a coefficient for the component z, and d in this case is an intercept. The coefficients a, b, and c and the constant d are data representing the hyperplane.

The hyperplane involves as many Equations (1) as the components of the output color space CS5 of the color conversion table 601. For example, as many Equations (1) as the three Lab components are needed for the A2B table 611, and as many Equations (1) as the four cmyk components are needed for the B2A table 621 or the device link table 631.

The coefficients a, b, and c and the constant d for the hyperplane can be determined by four adjustment points P0, i.e., three independent vectors, within the interpolation range 700, but can also otherwise determined. A method for determining the coefficients a, b, and c and the constant d according to the number of adjustment points P0 within the interpolation range 700 will be described below.

In a case where one interpolation range 700 includes one adjustment point P1 as the adjustment point P0 (see FIG. 11A), the host apparatus 100 determines a hyperplane passing through the coordinates p1 ($x_{P1}$, $y_{P1}$, $z_{P1}$, $w_{P1}$) of the adjustment point P1 and having a slope of 0, in the virtual space SP0 (S204). In this case, a=b=c=0 and d=AD0 may be set. This allows determination of data representing the hyperplane in a case where the interpolation range 700 includes only one adjustment point P0 to determine the grid point adjustment amounts AD10 for each reference grid point GD10 to be the set adjustment amounts AD0 in a process in subsequent S214.

In a case where one interpolation range 700 includes two adjustment points P1 and P2 as the adjustment points P0 (see FIG. 11B), the host apparatus 100 determines a hyperplane passing through the coordinates p0 of the two adjustment points P1 and P2 in the virtual space SP0 (S206). Here, a vector (denoted by $V_0$) is determined from a difference between the coordinates p1 ($x_{P1}$, $y_{P1}$, $z_{P1}$, $w_{P1}$) of the adjustment point P1 and the coordinates p2 ($x_{P2}$, $y_{P2}$, $z_{P2}$, $w_{P2}$) of the adjustment point P1. A second vector (denoted by $V_1$) is determined to be orthogonal to the vector $V_0$ and such that a vector in the w direction is 0. Here, the x, y, z, and w components of the vector $V_0$ are represented as $V_0[0]$, $V_0[1]$, $V_0[2]$, and $V_0[3]$, and the x, y, z, and w components of the vector $V_1$ are represented as $V_1[0]$, $V_1[1]$, $V_1[2]$, and $V_1[3]$. The components of the vector $V_1$ may be determined as follows.

$$V_1[0]=-V_0[1] \quad (2)$$

$$V_1[1]=V_0[0] \quad (3)$$

$$V_1[2]=1/V_0[2] \quad (4)$$

$$V_1[3]=0 \quad (5)$$

A third vector (denoted by $V_2$) is also determined such that the vector in the w direction is 0. Here, the x, y, z, and w components of the vector $V_2$ are represented as $V_2[0]$, $V_2[1]$, $V_2[2]$, and $V_2[3]$. The components of the vector $V_2$ may be determined as follows.

$$V_2[0]=-(V_0[1]+V_1[1]) \quad (6)$$

$$V_2[1]=(V_0[0]+V_1[0]) \quad (7)$$

$$V_2[2]=V_0[0]\times V_2[0]/V_0[2] \quad (8)$$

$$V_2[3]=0 \quad (9)$$

Each of the three vectors $V_0$, $V_1$, and $V_2$ is orthogonal to a normal vector (denoted by N. N is (a, b, c, d)) in the equations for the hyperplane. Therefore, an inner product $N \cdot V_0$ between the normal vector N and each of the vectors $V_0$, $V_1$, and $V_2$ is 0.

$$a\times V_0[0]+b\times V_0[1]+c\times V_0[2]+d\times 0=0 \quad (10)$$

$$a\times V_1[0]+b\times V_1[1]+c\times V_1[2]+d\times 0=0 \quad (11)$$

$$a\times V_2[0]+b\times V_2[1]+c\times V_2[2]+d\times 0=0 \quad (12)$$

Solution of Equations (10) to (12) allows the coefficients a, b, and c to be determined. After determination of the coefficients a, b, and c, the coordinates p1 of one of the adjustment points P0, e.g., the adjustment point P1, are substituted into Equations (1) for the hyperplane to allow the constant d to be determined.

$$d=-(ax_{P1}+by_{P1}+cz_{P1})+w_{P1} \quad (13)$$

Of course, the coordinates p2 of the adjustment point P2 may be substituted into Equations (1) for the hyperplane.

As described above, the data representing the hyperplane is determined in the case where the interpolation range 700 includes two adjustment points P0.

In a case where one interpolation range 700 includes three adjustment points (referred to as adjustment points P1, P2, and P3) as the adjustment points P0, the host apparatus 100 determines a hyperplane passing through the coordinates p0 of the three adjustment points P1, P2, and P3 in the virtual space SP0 (S208). In this case, for example, the vector $V_0$ is determined from the difference between the coordinates p1 of the adjustment point P1 and the coordinates p2 of the adjustment point P2, and the vector $V_1$ is determined from the difference between the coordinates p1 of the adjustment point P1 and the coordinates (denoted by p3) of the adjustment point P3. The third vector (denoted by $V_2$) is determined such that the vector in the w direction is 0. The components of the vector $V_2$ may be determined by Equations (6) to (9). Solution of Equations (10) to (12) similarly allows the coefficients a, b, and c to be determined, and Equation (13) similarly allows the constant d to be determined. Of course, the coordinates p2 of the adjustment point P2 or the coordinates p3 of the adjustment point P3 may be substituted into Equations (1) for the hyperplane.

As described above, the data representing the hyperplane is determined in the case where the interpolation range 700 includes three adjustment points P0.

In a case where one interpolation range 700 includes four adjustment points (referred to as adjustment points P1, P2, P3, and P4) as the adjustment points P0, the host apparatus 100 determines a hyperplane passing through the coordinates p0 of the four adjustment points P1, P2, P3, and P4 in the virtual space SP0 (S210). In this case, for example, the vector $V_0$ is determined from the difference between the coordinates p1 of the adjustment point P1 and the coordinates p2 of the adjustment point P2. The vector $V_1$ is determined from the difference between the coordinates p1 of the adjustment point P1 and the coordinates (denoted by p3) of the adjustment point P3. The vector $V_2$ is determined from the difference between the coordinates p1 of the adjustment point P1 and the coordinates (denoted by p4) of the adjustment point P4. Solution of Equations (10) to (12) similarly allows the coefficients a, b, and c to be determined, and Equation (13) similarly allows the constant d to be determined. Of course, the coordinates p2 of the adjustment point P2, the coordinates p3 of the adjustment point P3, or the coordinates p4 of the adjustment point P4 may be substituted into Equations (1) for the hyperplane.

As described above, the data representing the hyperplane is determined in the case where the interpolation range 700 includes four adjustment points P0.

In a case where one interpolation range 700 includes five or more adjustment points P0, the host apparatus 100 uses the least squares method to determine the coefficients a, b, and c and the constant d of the hyperplane in the virtual space SP0 (S212). A distance between the hyperplane to be determined and an adjustment point (i) is denoted by $e_i$. The distance $e_i$ is then represented by the equation below. In the equation, the variable i is a variable identifying the adjustment point P0. A variable $x_i$ is an x coordinate of an adjustment point (i), a variable $y_i$ is a y coordinate of the adjustment point (i), a variable $z_i$ is a z coordinate of an adjustment point (i), and a variable $w_i$ is a w coordinate of the adjustment point (i).

[Mathematical Equation 1]

$$e_i = ax_i + by_i + cz_i + d - w_i \tag{14}$$

The square sum (denoted by E) of the distances $e_i$ between the hyperplane and the adjustment points (i) within the interpolation range 700 is represented by the following equation.

[Mathematical Equation 2]

$$E = \sum_{i=0}^{N-1} e_i = \sum_{i=0}^{N-1}(a\ x_i + b\ y_i + c\ z_i + d - w_i)^2 \tag{15}$$

The least squares method determines the coefficients a, b, and c and the constant d that minimize the square sum E.

For the coefficients a, b, and c and the constant d, Equation (15) is partially differentiated, and the minimum value is obtained when the resultant slope is 0. That is, the following equations are satisfied.

[Mathematical Equation 3]

$$\frac{\partial E}{\partial a} = 2\sum x_i(ax_i + by_i + cz_i + d - w_i) = 0 \tag{16}$$

$$\frac{\partial E}{\partial b} = 2\sum y_i(ax_i + by_i + cz_i + d - w_i) = 0 \tag{17}$$

$$\frac{\partial E}{\partial c} = 2\sum z_i(ax_i + by_i + cz_i + d - w_i) = 0 \tag{18}$$

$$\frac{\partial E}{\partial d} = 2\sum (ax_i + by_i + cz_i + d - w_i) = 0 \tag{19}$$

Here, a term of integration calculation is replaced as follows.

[Mathematical Equation 4]

$$\sum_{i=0}^{N-1} x_i x_i = SigmaXX \tag{20}$$

$$\sum_{i=0}^{N-1} x_i y_i = SigmaXY \tag{21}$$

$$\sum_{i=0}^{N-1} x_i z_i = SigmaXZ \tag{22}$$

$$\sum_{i=0}^{N-1} x_i w_i = SigmaXW \tag{23}$$

[Mathematical Equation 5]

$$\sum_{i=0}^{N-1} y_i y_i = SigmaYY \tag{24}$$

$$\sum_{i=0}^{N-1} y_i z_i = SigmaYZ \tag{25}$$

$$\sum_{i=0}^{N-1} y_i w_i = SigmaYW \tag{26}$$

[Mathematical Equation 6]

$$\sum_{i=0}^{N-1} z_i z_i = SigmaZZ \tag{27}$$

$$\sum_{i=0}^{N-1} z_i w_i = SigmaZW \tag{28}$$

$$\sum_{i=0}^{N-1} w_i w_i = SigmaWW \tag{29}$$

[Mathematical Equation 7]

$$\sum_{i=0}^{N-1} x_i = SigmaX \tag{30}$$

$$\sum_{i=0}^{N-1} y_i = SigmaY \tag{31}$$

$$\sum_{i=0}^{N-1} z_i = SigmaZ \tag{32}$$

Substituting Equations (20) to (32) into Equations (16) to (19) allows for the following representation.

[Mathematical Equation 8]

$$aSigmaXX + bSigmaXY + cSigmaXZ + Nd - SigmaXW = 0 \tag{33}$$

$$aSigmaXY + bSigmaYY + cSigmaYZ + Nd - SigmaYW = 0 \tag{34}$$

$$aSigmaXZ + bSigmaYZ + cSigmaZZ + Nd - SigmaZW = 0 \tag{35}$$

$$aSigmaX + bSigmaY + cSigmaZ + Nd - SigmaW = 0 \tag{36}$$

Solution of simultaneous equations (33) to (36) allows the coefficients a, b, and c and the constant d to be determined.

As described above, the data representing the hyperplane is determined in the case where the interpolation range 700 includes five or more adjustment points P0.

Of course, instead of the least squares method, the maximum likelihood estimation, the Random Sampling Consensus (RANSAC), or the M-estimation may be used to determine the data representing the hyperplane.

After determining the hyperplane, the host apparatus 100 determines the grid point adjustment amounts AD10 for the positions of the reference grid points GD10 (m components) in the virtual space SP0, based on the data (a, b, c, d) representing the hyperplane (S214), and ends the grid point adjustment amount determination process. When the three components x, y, and z of each reference grid point GD10 are substituted into Equations (1) for the hyperplane for which the coefficients a, b, and c and the constant d have been determined, the adjustment amount w satisfying the three components x, y, and z is determined to be the grid point adjustment amount AD10. For example, in a case where the to-be-adjusted profile 550 is the output profile 620, the input color space CS4 of the B2A table 621 of the output profile 620 includes three components L, a, and b. Thus, respectively applying the three components L, a, and b to the coefficients a, b, and c allows determination of the grid point adjustment amounts AD10 for each reference grid point GD10 in the B2A table 621. Furthermore, in a case where the to-be-adjusted profile 550 is the input profile 610, the input color space CS4 of the A2B table 611 of the input profile 610 includes four components C, M, Y, and K. Thus, respectively applying the three components C, M, and Y, included in the four components, to the coefficients a, b, and c allows determination of the grid point adjustment amounts AD10 for each reference grid point GD10 in the A2B table 611. The determined grid point adjustment amounts AD10 may be applied to the reference grid points GD10 for both the case where K=K1 and the case where K=K2.

Note that any of the output coordinate values of any of the reference grid points GD10 may be expected to be larger than an upper limit or smaller than a lower limit depending on the corresponding set adjustment amount AD0 for the adjustment point P0. Thus, a limit may be set for each of the grid point adjustment amounts AD10 for each reference grid point GD10.

Figure 12:
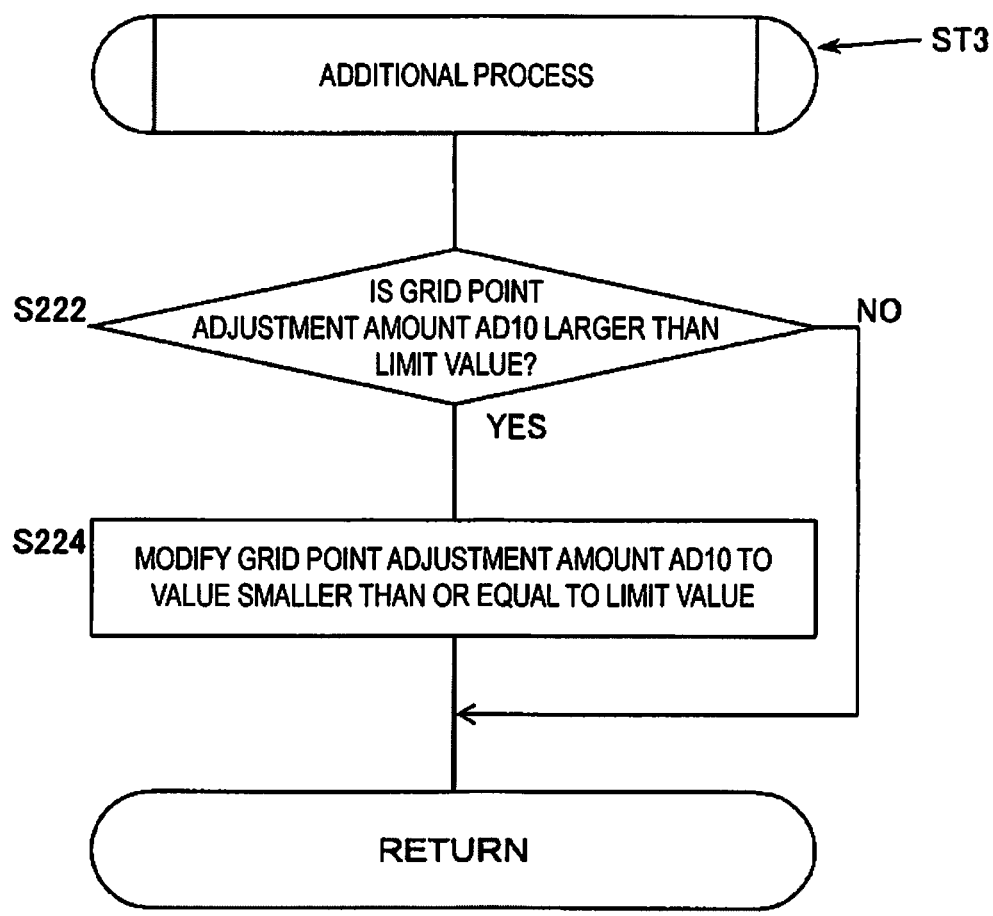
FIG. 12 is a flowchart illustrating an example of an additional process.

FIG. 12 illustrates an additional process in a case where a limit is set for each grid point adjustment amount AD10. This process is executed, e.g., immediately after the grid point adjustment amount determination process illustrated in FIG. 11.

When the additional process is started, the host apparatus 100 branches the process depending on whether any of the grid point adjustment amounts AD10 resulting from the grid point adjustment amount determination process is larger than a limit value (S222). In a case where any of the grid point adjustment amounts AD10 is larger than the limit value, the host apparatus 100 modifies the grid point adjustment amount AD10 to the limit value or a value smaller than the limit value (S224) to end the additional process. In a case where all of the grid point adjustment amounts AD10 are smaller than or equal to the limit values, the host apparatus 100 ends the additional process without executing the process in S224.

For example, the grid point adjustment amounts AD10 are assumed to be the relative values of the cmyk values, and a possible range of each of the cmyk values is assumed to be from 0 to 100. In this case, when any of the grid point adjustment amounts AD10 is larger than 100 or smaller than −100, the corresponding output coordinate value of the reference grid point GD10 fails to fall within the range from 0 to 100. Thus, in a case where any of the grid point adjustment amounts AD10 is larger than a threshold Th (0<Th<100), the grid point adjustment amount AD10 may be modified to the threshold Th. In a case where any of the grid point adjustment amounts AD10 is smaller than a threshold −Th, the grid point adjustment amount AD10 may be modified to the threshold −Th. Of course, for the reference grid point GD10, in a case where the original output coordinate value plus the grid point adjustment amount AD10 is larger than the upper limit for the output coordinate value, the grid point adjustment amount AD10 may be modified such that the original output coordinate value plus the grid point adjustment amount AD10 is smaller than or equal to the upper limit value. For the reference grid point GD10, in a case where the original output coordinate value plus the grid point adjustment amount AD10 is smaller than the lower limit for the output coordinate value, the grid point adjustment amount AD10 may be modified such that the original output coordinate value plus the grid point adjustment amount AD10 is larger than or equal to the lower limit value.

As described above, in a case where the plurality of adjustment points P0 are accepted within the interpolation range 700, the host apparatus 100 uses the set adjustment amounts AD0 for each of the adjustment points P0 to determine the grid point adjustment amounts AD10 for the plurality of reference grid points GD10.

Again, with reference to FIG. 8, the description is continued. After determining the grid point adjustment amounts AD10 for each reference grid point GD10, the host apparatus 100 adjusts the output coordinate values of the grid points GD0 including the reference grid points GD10 in the color conversion table 601, based on the grid point adjustment amounts AD10 (S124). Thus, the color conversion table 601 is adjusted, and the adjusted color conversion table 601 is stored in the to-be-adjusted profile 550, which is thus adjusted. For example, for each reference grid point GD10, each output coordinate value plus the corresponding grid point adjustment amount AD10 can be set to the adjusted output coordinate value. Furthermore, in a case where a grid point for which the grid point adjustment amounts AD10 have not been determined is located within a prescribed distance from a reference grid point GD10 for which the grid point adjustment amounts AD10 have been determined, e.g., the grid point is located adjacent to the reference grid point GD10, smoothing may be executed to smooth the adjustment amounts between the grid points, based on the grid point adjustment amounts AD10 to adjust the output coordinate values.

After adjusting the output coordinate values of the grid points GD0 in the color conversion table 601, the host apparatus 100 branches the process depending on whether an end condition is met (S126). In a case where the end condition is not met, the host apparatus 100 repeats the process in S102 to S126. In a case where the end condition is met, the host apparatus 100 ends the color conversion table adjustment process.

For example, the host apparatus 100 uses at least the to-be-adjusted profile 550 that has been adjusted to determine a color difference between the set of adjusted Lab values and the set of Lab values of the target T0 for each adjustment point P0. The host apparatus 100 determines that the end condition is met in a case where all the color differences are smaller than or equal to a prescribed threshold, and determines that the end condition is not met in a case where any of the color differences is larger than the prescribed threshold. Examples of the color difference to be used include a color difference $\Delta E_{00}$ represented by a CIEDE2000 color difference formula, a color difference $\Delta E^*_{94}$ represented by a CIE1994 color difference formula, a color difference $\Delta E^*_{ab}$ (what is called $\Delta E^*_{76}$) based on a CIE L*a*b* color system proposed in 1976, and a color difference $\Delta E^*_{uv}$ based on a CIE L*u*v* color system. Alternatively, the host apparatus 100 determines that the end condition is met in a case where the determination process in S126 has been executed a specified number of times. Moreover, the host apparatus 100 may determine that the end condition is met in a case where the host apparatus 100 accepts an operation of selecting whether to end the adjustment of the color conversion table 601 and accepts an operation of ending the adjustment of the color conversion table 601, and determine that the end condition is not met in a case where the host apparatus 100 accepts an operation of avoiding ending the adjustment of the color conversion table 601.

In this specific example, a plurality of adjustment points P0 may be set within the same interpolation range 700. In this case, the set adjustment amounts AD0 for each of the adjustment points P0 are used to determine the grid point adjustment amounts AD10 for the plurality of reference grid points GD10, thus adjusting the color conversion table 601. Therefore, in this specific example, the adjustment amounts for one point and the adjustment amounts for another point within the same interpolation range 700 in the color conversion table 601 can be made closer to a user's intention. This enables accurate adjustment even in a case where a plurality of adjustment points are close to one another. This improves the color reproduction accuracy of the to-be-adjusted color conversion table.

Here, as illustrated in FIG. 13, the first adjustment point P1 and the second adjustment point P2 are two adjustment points P0 located at different positions and included in the plurality of adjustment points P0 accepted within the interpolation range 700. The example illustrated in FIG. 13 is the grid 900 in the B2A table 621 of the output profile 620. The first adjustment point P1 has coordinates ($L_{P1}$, $a_{P1}$, $b_{P1}$), and the second adjustment point P2 has coordinates ($L_{P2}$, $a_{P2}$, $b_{P2}$). The different adjustment points P1 and P2 mean that the adjustment points P1 and P2 are different from each other in at least one of the L value, the a value, and the b value. Furthermore, a first reference grid point GD11 and a second reference grid point GD12 are two reference grid points GD10 located at different positions and included in the plurality of reference grid points GD10. In the example illustrated in FIG. 13, the first reference grid point GD11 has coordinates ($c_{GD11}$, $m_{GD11}$, $y_{GD11}$, $k_{GD11}$), and the second reference grid point GD12 has coordinates ($C_{GD12}$, $m_{GD12}$, $y_{GD12}$, $k_{GD12}$). In the grid point adjustment amount determining process in S122 illustrated in FIG. 8, in a case where the set adjustment amounts AD1 for the first adjustment point P1 are different from the set adjustment amounts AD2 for the second adjustment point P2, the grid point adjustment amounts AD11 for the first reference grid point GD11 are different from the grid point adjustment amounts AD12 for the second reference grid point GD12 unless the additional process illustrated in FIG. 12 is executed. That is, in a case where the set adjustment amounts AD1 are different from the set adjustment amounts AD2, the host apparatus 100 executes a process for making the grid point adjustment amounts AD11 different from the grid point adjustment amounts AD12 to determine the grid point adjustment amounts AD10 for the plurality of reference grid points GD10. In the example illustrated in FIG. 13, the different grid point adjustment amounts AD11 and AD12 mean that the grid point adjustment amounts AD11 are different from the grid point adjustment amounts AD12 in at least one of the L value, the a value, and the b value.

In this specific example, in a case where the set adjustment amounts AD1 for the adjustment point P1 are different from the set adjustment amounts AD2 for the adjustment point P2 within the same interpolation range 700, the grid point adjustment amounts AD11 for the reference grid point GD11 are different from the grid point adjustment amounts AD12 for the reference grid point GD12. This allows the adjustment amounts for one point and the adjustment amounts for another point within the same interpolation range 700 to be made closer to a user's intention. This also improves the color reproduction accuracy of the to-be-adjusted color conversion table.

7. MODIFIED EXAMPLES

Within the scope of the invention, various modified examples are conceivable.

For example, the output device is not limited to the ink jet-type printer but may be an electrophotographic printer such as a laser printer which uses toner as a color material, a three-dimensional printer, a display apparatus, or the like.

The types of color materials forming images are not limited to C, M, Y, and K but may include not only C, M, Y, and K but also dark yellow (DY), orange (Or), and green (Gr) that are higher in density than Lc, Lm, and Y, light black (Lk) that is lower in density than K, a non-tinted color material for image quality improvement, and the like.

Of course, the second color space is not limited to the cmyk color space but may be a CMY color space, an RGB color space, or the like.

The target device is not limited to the target printing machine but may be a display apparatus or the like.

Of course, the first color space is not limited to the CMYK color space but may be a CMY color space, an RGB color space, or the like.

The color conversion table to which the technique is applicable is not limited to the color conversion table included in the ICC profile but may be, e.g., a color conversion table in which the intensities of the RGB colors are associated with the use amounts of inks in different colors (e.g., C, M, Y, K, Lc, and Lm).

Furthermore, the technique is also applicable to a five-or-more-dimensional color conversion table such as a conversion table in which the use amounts of inks in five or more colors used in a first device are associated with the use amounts of inks used in a second device.

As illustrated in FIG. 14, the grid point adjustment amount determination process in S122 illustrated in FIG. 8 may include determining the grid point adjustment amounts AD10 to be average values of the set adjustment amounts AD0 for the plurality of adjustment points P0 accepted within the interpolation range 700. In the example illustrated in FIG. 14, the first adjustment point P1, the adjustment point P2, and the third adjustment point P3 are three adjustment points P0 located at different positions and accepted within the interpolation range 700. The example illustrated in FIG. 14 is the grid 900 in the B2A table 621 of the output profile 620. The set adjustment amounts AD1 are acquired for the first adjustment point P1 ($L_{P1}$, $a_{P1}$, $b_{P1}$), the set adjustment amounts AD2 are acquired for the second adjustment point P2 ($L_{P2}$, $a_{P2}$, $b_{P2}$), and the set adjustment amounts AD3 are acquired for the third adjustment point P3 ($L_{P3}$, $a_{P3}$, $b_{P3}$). Furthermore, the first reference grid point GD11 and the second reference grid point GD12 are two reference grid points GD10 located at different positions and included in the plurality of reference grid points GD10.

In the grid point adjustment amount determination process in S122 illustrated in FIG. 8, the host apparatus 100 executes a process for determining the grid point adjustment amounts AD10 for the reference grid points GD10 to be the average values of the set adjustment amounts AD1, AD2, and AD3, the grid point adjustment amounts AD10 for the reference grid points GD10 including the grid point adjustment amounts AD11 for the reference grid point GD11 and the grid point adjustment amounts AD12 for the reference grid point GD12. FIG. 14 illustrates that the grid point adjustment amounts AD11 and AD12 are determined to be arithmetic mean values (AD1+AD2+AD3)/3. However, the mean values may be geometric means, harmonic means, or the like.

In the example illustrated in FIG. 14, the grid point adjustment amounts AD10 are determined to be average values of the set adjustment amounts AD0 for each of the plurality of adjustment points P0 present within the same interpolation range 700, thus adjusting the color conversion table 601. This suppresses significant deviation, from the user's intension, of the adjustment amounts for one point within the same interpolation range 700 and significant deviation, from the user's intension, of the adjustment amounts for another point within the same interpolation range 700. This improves the color reproduction accuracy of the to-be-adjusted color conversion table.

8. CONCLUSION

As described above, the various aspects of the invention can provide, e.g., a technique capable of improving the color reproduction accuracy of the to-be-adjusted color conversion table. Of course, even a technique including only the components recited in the independent claims produces the above-described basic advantages.

Furthermore, the aspects of the invention can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the invention include these configurations and the like.

This application claims priority under 35 U.S.C. § 119 to Japanese Patent Application No. 2017-242387, filed Dec. 19, 2017. The entire disclosure of Japanese Patent Application No. 2017-242387 is hereby incorporated herein by reference.

What is claimed is:

1. A color conversion table adjustment method for causing a computer to execute a process for adjusting a color conversion table representing a correspondence relationship between coordinate values in an input color space and coordinate values in an output color space for a plurality of grid points, the color conversion table adjustment method comprising:
    enabling acceptance of a plurality of adjustment points within an interpolation range defined by a plurality of reference grid points included in the plurality of grid points in the color conversion table and referenced when output coordinate values in the output color space are interpolated, the interpolation range dividing the input color space;
    acquiring set adjustment amounts representing amounts of adjustment for the accepted adjustment points;
    determining, by using the set adjustment amounts for each of the plurality of adjustment points, grid point adjustment amounts representing amounts of adjustment for the plurality of reference grid points in a case where the plurality of adjustment points are accepted within the interpolation range; and
    adjusting the color conversion table, based on the grid point adjustment amounts, wherein
    in the determination of the grid point adjustment amounts, in an m+1-dimensional virtual space including m components included in components along n coordinate axes of the input color space and adjustment amounts representing amounts of adjustment for the color conversion table and added as a component, m being an integer of 3 or larger and n or smaller, n being an integer of 3 or larger, data is determined that represents a hyperplane adapted to positions with coordinates corresponding to the m components and the set adjustment amounts for the plurality of adjustment points accepted within the interpolation range, and based on the data, adjustment amounts satisfying the m components for the plurality of reference grid points in the hyperplane are determined to be the grid point adjustment amounts.

2. The color conversion table adjustment method according to claim 1, wherein
    a first adjustment point and a second adjustment point are two adjustment points located at different positions and included in the plurality of adjustment amounts accepted within the interpolation range, and a first reference grid point and a second reference grid point are two reference grid points located at different positions and included in the plurality of reference grid points, and
    in the determination of the grid point adjustment amounts, in a case where the set adjustment amounts for the first adjustment point are different from the set adjustment amounts for the second adjustment point, the grid point adjustment amounts for the first reference grid point are made different from the grid point adjustment amounts for the second reference grid point to determine the grid point adjustment amounts for the plurality of reference grid points.

3. The color conversion table adjustment method according to claim 1, wherein
    in the determination of the grid point adjustment amounts, values representing the positions of the plurality of adjustment points within the interpolation range and the set adjustment amounts are used to determine the grid point adjustment amounts for the plurality of reference grid points.

4. The color conversion table adjustment method according to claim 1, wherein
    a first adjustment point and a second adjustment point are two adjustment points located at different positions and included in the plurality of adjustment amounts accepted within the interpolation range, and a first reference grid point and a second reference grid point are two reference grid points located at different positions and included in the plurality of reference grid points,
    in the determination of the grid point adjustment amounts, in a case where the set adjustment amounts for the first adjustment point are different from the set adjustment amounts for the second adjustment point, the grid point adjustment amounts for the first reference grid point are made different from the grid point adjustment amounts for the second reference grid point to determine the grid point adjustment amounts for the plurality of reference grid points, and
    values representing the positions of the plurality of adjustment points within the interpolation range and the set adjustment amounts are used to determine the grid point adjustment amounts for the plurality of reference grid points.

5. The color conversion table adjustment method according to claim 1, wherein
    in a case where two or more and m+1 or less adjustment points are accepted within the interpolation range, data is determined that represents the hyperplane passing through positions with coordinates corresponding to the m components and the set adjustment amounts for the plurality of adjustment points in the virtual space.

6. The color conversion table adjustment method according to claim 1, wherein in a case where two or more and m+1 or less adjustment points are accepted within the interpolation range, data is determined that represents the hyperplane passing through positions with coordinates corresponding to the m components and the set adjustment amounts for the plurality of adjustment points in the virtual space, and in a case where m+2 or more adjustment points are accepted within the interpolation range, a least squares method is used to determine data representing the hyperplane in the virtual space.

7. The color conversion table adjustment method according to claim 1, wherein the determination of the grid point adjustment amounts includes determining the grid point adjustment amounts to be average values of the set adjustment amounts for the plurality of adjustment points accepted within the interpolation range.

8. A color conversion table adjustment method for causing a computer to execute a process for adjusting a color conversion table representing a correspondence relationship between coordinate values in an input color space and coordinate values in an output color space for a plurality of grid points, the color conversion table adjustment method comprising:

acquiring set adjustment amounts representing amounts of adjustment for a plurality of adjustment points present within an interpolation range defined by a plurality of reference grid points included in the plurality of grid points in the color conversion table and referenced when output coordinate values in the output color space are interpolated, the interpolation range dividing the input color space;

determining, by using the set adjustment amounts, grid point adjustment amounts representing amounts of adjustment for the plurality of reference grid points; and adjusting the color conversion table, based on the grid point adjustment amounts, wherein a first adjustment point and a second adjustment point are two adjustment points located at different positions and included in the plurality of adjustment amounts accepted within the interpolation range, and a first reference grid point and a second reference grid point are two reference grid points located at different positions and included in the plurality of reference grid points, in the determination of the grid point adjustment amounts, in a case where the set adjustment amounts for the first adjustment point are different from the set adjustment amounts for the second adjustment point, the grid point adjustment amounts for the first reference grid point are made different from the grid point adjustment amounts for the second reference grid point to determine the grid point adjustment amounts for the plurality of reference grid points, and in the determination of the grid point adjustment amounts, in an m+1-dimensional virtual space including m components included in components along n coordinate axes of the input color space and adjustment amounts representing amounts of adjustment for the color conversion table and added as a component, m being an integer of 3 or larger and n or smaller, n being an integer of 3 or larger, data is determined that represents a hyperplane adapted to positions with coordinates corresponding to the m components and the set adjustment amounts for the plurality of adjustment points accepted within the interpolation range, and based on the data, adjustment amounts satisfying the m components for the plurality of reference grid points in the hyperplane are determined to be the grid point adjustment amounts.

\* \* \* \* \*